US012020309B2

(12) United States Patent
Geisler et al.

(10) Patent No.: US 12,020,309 B2
(45) Date of Patent: Jun. 25, 2024

(54) AUGMENTED REALITY GIFTING ON A MOBILE DEVICE

(71) Applicant: e2interactive, Inc., Atlanta, GA (US)

(72) Inventors: Karl Joseph Geisler, Kansas City, MO (US); Brett R. Glass, Kansas City, MO (US)

(73) Assignee: E2INTERACTIVE, INC., Atlanta, GA (US)

( * ) Notice: Subject to any disclaimer, the term of this patent is extended or adjusted under 35 U.S.C. 154(b) by 0 days.

(21) Appl. No.: 16/415,314

(22) Filed: May 17, 2019

(65) Prior Publication Data
US 2019/0355050 A1 Nov. 21, 2019

Related U.S. Application Data

(60) Provisional application No. 62/673,280, filed on May 18, 2018.

(51) Int. Cl.
| | |
|---|---|
| *G06Q 30/00* | (2023.01) |
| *G06Q 30/0601* | (2023.01) |
| *G06T 19/00* | (2011.01) |
| *G06V 20/20* | (2022.01) |

(52) U.S. Cl.
CPC ....... *G06Q 30/0639* (2013.01); *G06T 19/006* (2013.01); *G06V 20/20* (2022.01)

(58) Field of Classification Search
CPC ......... G06Q 30/0639; G06Q 30/06–08; G06K 9/00671; G06T 19/006
USPC ..................................................... 705/26.9
See application file for complete search history.

(56) References Cited

U.S. PATENT DOCUMENTS

| | | |
|---|---|---|
| 794,417 A | 7/1905 | Maniachi |
| 3,288,350 A | 11/1966 | Kushner |
| 4,068,213 A | 1/1978 | Nakamura et al. |
| 4,482,802 A | 11/1984 | Aizawa et al. |
| 4,734,858 A | 3/1988 | Schlafly |
| 4,747,049 A | 5/1988 | Richardson et al. |

(Continued)

FOREIGN PATENT DOCUMENTS

| | | |
|---|---|---|
| EP | 0950968 A4 | 5/2004 |
| EP | 1519332 A1 | 3/2005 |

(Continued)

OTHER PUBLICATIONS

Pejsa, Tomislav, et al. "Room2room: Enabling life-size telepresence in a projected augmented reality environment." Proceedings of the 19th ACM conference on computer-supported cooperative work & social computing. 2016.*

(Continued)

*Primary Examiner* — Kathleen Palavecino
(74) *Attorney, Agent, or Firm* — Landmark Intellectual Property Law, LLC; Gregory M Murphy

(57) ABSTRACT

A system for receiving environment information, gift information, and location information and creating an augmented gifting environment are presented herein. An application may receive an image of a gifting environment and a gift to be placed in the gifting environment. A gift recipient may scan the environment that is represented by the gifting environment and the application may provide a virtual gift representing the gift in the scanned environment presenting the virtual gift in an augmented reality environment.

15 Claims, 7 Drawing Sheets

(56) References Cited

U.S. PATENT DOCUMENTS

| | | |
|---|---|---|
| 4,755,940 A | 7/1988 | Brachtl et al. |
| 4,767,917 A | 8/1988 | Ushikubo |
| 4,795,892 A | 1/1989 | Gilmore et al. |
| 4,877,947 A | 10/1989 | Mori |
| 4,900,904 A | 2/1990 | Wright et al. |
| 4,908,521 A | 3/1990 | Boggan et al. |
| 4,943,707 A | 7/1990 | Boggan |
| 5,091,634 A | 2/1992 | Finch et al. |
| 5,117,355 A | 5/1992 | McCarthy |
| 5,202,826 A | 4/1993 | McCarthy |
| 5,239,165 A | 8/1993 | Novak |
| 5,255,182 A | 10/1993 | Adams |
| 5,256,863 A | 10/1993 | Ferguson et al. |
| 5,311,424 A | 5/1994 | Mukherjee et al. |
| 5,367,148 A | 11/1994 | Storch et al. |
| 5,375,240 A | 12/1994 | Grundy |
| 5,383,113 A | 1/1995 | Kight et al. |
| 5,384,449 A | 1/1995 | Peirce |
| 5,465,288 A | 11/1995 | Falvey et al. |
| 5,477,038 A | 12/1995 | Levine et al. |
| 5,500,513 A | 3/1996 | Langhans et al. |
| 5,502,765 A | 3/1996 | Ishiguro et al. |
| 5,511,114 A | 4/1996 | Stimson et al. |
| 5,577,109 A | 11/1996 | Stimson et al. |
| 5,581,064 A | 12/1996 | Riley et al. |
| 5,590,038 A | 12/1996 | Pitroda |
| 5,602,377 A | 2/1997 | Beller et al. |
| 5,619,559 A | 4/1997 | Kennedy |
| 5,621,201 A | 4/1997 | Langhans et al. |
| 5,621,787 A | 4/1997 | McKoy et al. |
| 5,644,721 A | 7/1997 | Chung et al. |
| 5,657,389 A | 8/1997 | Houvener |
| 5,671,279 A | 9/1997 | Elgamal |
| 5,679,938 A | 10/1997 | Templeton et al. |
| 5,679,940 A | 10/1997 | Templeton et al. |
| 5,696,909 A | 12/1997 | Wallner |
| 5,699,528 A | 12/1997 | Hogan |
| 5,705,798 A | 1/1998 | Tarbox |
| 5,708,780 A | 1/1998 | Levergood |
| 5,721,768 A | 2/1998 | Stimson et al. |
| 5,721,781 A | 2/1998 | Deo et al. |
| 5,729,693 A | 3/1998 | Holda-Fleck |
| 5,732,136 A | 3/1998 | Murphree et al. |
| 5,734,719 A | 3/1998 | Tsevdos et al. |
| 5,740,915 A | 4/1998 | Williams |
| 5,754,655 A | 5/1998 | Hughes et al. |
| 5,760,381 A | 6/1998 | Stich et al. |
| 5,777,305 A | 7/1998 | Smith et al. |
| 5,799,285 A | 8/1998 | Klingman |
| 5,806,045 A | 9/1998 | Biorge et al. |
| 5,828,740 A | 10/1998 | Khuc et al. |
| 5,844,972 A | 12/1998 | Jagadish et al. |
| 5,850,217 A | 12/1998 | Cole |
| 5,857,175 A | 1/1999 | Day et al. |
| 5,873,072 A | 2/1999 | Kight et al. |
| 5,878,401 A | 3/1999 | Joseph |
| 5,884,271 A | 3/1999 | Pitroda |
| 5,889,270 A | 3/1999 | Haagen et al. |
| 5,889,863 A | 3/1999 | Weber |
| 5,897,625 A | 4/1999 | Gustin |
| 5,903,633 A | 5/1999 | Lorsch |
| 5,903,830 A | 5/1999 | Joao et al. |
| 5,903,874 A | 5/1999 | Leonard et al. |
| 5,907,142 A | 5/1999 | Kelsey |
| 5,909,492 A | 6/1999 | Payne et al. |
| 5,913,210 A | 6/1999 | Call |
| 5,918,213 A | 6/1999 | Bernard et al. |
| 5,930,363 A | 7/1999 | Stanford et al. |
| 5,945,653 A | 8/1999 | Walker et al. |
| 5,950,173 A | 9/1999 | Perkowski |
| 5,953,710 A | 9/1999 | Fleming |
| 5,956,695 A | 9/1999 | Carrithers et al. |
| 5,956,700 A | 9/1999 | Landry |
| 5,968,110 A | 10/1999 | Westrope et al. |
| 5,984,508 A | 11/1999 | Hurley |
| 5,988,509 A | 11/1999 | Taskett |
| 5,991,413 A | 11/1999 | Arditti et al. |
| 5,991,748 A | 11/1999 | Taskett |
| 5,991,749 A | 11/1999 | Morrill, Jr. |
| 5,999,624 A | 12/1999 | Hopkins |
| 6,000,608 A | 12/1999 | Dorf |
| 6,012,049 A | 1/2000 | Kawan |
| 6,018,570 A | 1/2000 | Matison |
| 6,018,719 A | 1/2000 | Rogers |
| 6,025,780 A | 2/2000 | Bowers et al. |
| 6,029,139 A | 2/2000 | Cunningham et al. |
| 6,029,141 A | 2/2000 | Bezos et al. |
| 6,029,151 A | 2/2000 | Nikander |
| 6,032,135 A | 2/2000 | Molano et al. |
| 6,032,859 A | 3/2000 | Muehlberger et al. |
| 6,039,244 A | 3/2000 | Finsterwald |
| 6,049,778 A | 4/2000 | Walker et al. |
| 6,055,511 A | 4/2000 | Luebbering et al. |
| 6,055,567 A | 4/2000 | Ganesan et al. |
| 6,058,300 A | 5/2000 | Hanson |
| 6,058,382 A | 5/2000 | Kasai et al. |
| 6,062,472 A | 5/2000 | Cheung |
| 6,070,150 A | 5/2000 | Remington et al. |
| 6,085,167 A | 7/2000 | Iguchi |
| 6,085,242 A | 7/2000 | Chandra |
| 6,088,682 A | 7/2000 | Burke |
| 6,092,053 A | 7/2000 | Boesch et al. |
| 6,098,053 A | 8/2000 | Slater |
| 6,105,008 A | 8/2000 | Davis et al. |
| 6,119,164 A | 9/2000 | Basche |
| 6,125,352 A | 9/2000 | Franklin et al. |
| 6,129,276 A | 10/2000 | Jelen et al. |
| 6,134,533 A | 10/2000 | Shell |
| 6,138,106 A | 10/2000 | Walker et al. |
| 6,138,911 A | 10/2000 | Fredregill et al. |
| 6,142,369 A | 11/2000 | Jonstromer |
| 6,148,249 A | 11/2000 | Newman |
| 6,167,387 A | 12/2000 | Lee-Wai-Yin |
| 6,169,890 B1 | 1/2001 | Vatanen |
| 6,173,272 B1 | 1/2001 | Thomas et al. |
| 6,175,823 B1 | 1/2001 | Dusen |
| 6,185,545 B1 | 2/2001 | Resnick et al. |
| 6,188,752 B1 | 2/2001 | Lesley |
| 6,219,652 B1 | 4/2001 | Carter et al. |
| 6,222,914 B1 | 4/2001 | McMullin |
| 6,226,364 B1 | 5/2001 | O'Neil |
| 6,240,397 B1 | 5/2001 | Sachs |
| 6,256,690 B1 | 7/2001 | Carper |
| 6,267,670 B1 | 7/2001 | Walker |
| 6,282,566 B1 | 8/2001 | Lee, Jr. et al. |
| 6,285,749 B1 | 9/2001 | Manto |
| 6,289,322 B1 | 9/2001 | Kitchen et al. |
| 6,295,522 B1 | 9/2001 | Boesch |
| 6,304,860 B1 | 10/2001 | Martin |
| 6,308,887 B1 | 10/2001 | Korman et al. |
| 6,311,165 B1 | 10/2001 | Coutts et al. |
| 6,311,170 B1 | 10/2001 | Embrey |
| 6,314,171 B1 | 11/2001 | Dowens |
| 6,315,195 B1 | 11/2001 | Ramachandran |
| 6,317,028 B1 | 11/2001 | Valiulis |
| 6,324,525 B1 | 11/2001 | Kramer et al. |
| 6,327,577 B1 | 12/2001 | Garrison et al. |
| 6,330,544 B1 | 12/2001 | Walker et al. |
| 6,332,135 B1 | 12/2001 | Conklin et al. |
| 6,333,976 B2 | 12/2001 | Lesley |
| 6,334,116 B1 | 12/2001 | Ganesan et al. |
| 6,360,254 B1 | 3/2002 | Linden |
| 6,363,362 B1 | 3/2002 | Burfield et al. |
| 6,363,364 B1 | 3/2002 | Nel |
| 6,366,893 B2 | 4/2002 | Hannula et al. |
| 6,375,073 B1 | 4/2002 | Aebi et al. |
| 6,422,462 B1 | 7/2002 | Cohen |
| 6,424,706 B1 | 7/2002 | Katz et al. |
| 6,434,238 B1 | 8/2002 | Chaum et al. |
| 6,442,532 B1 | 8/2002 | Kawan |
| 6,467,684 B2 | 10/2002 | Fite et al. |
| 6,473,500 B1 | 10/2002 | Risafi et al. |
| 6,473,739 B1 | 10/2002 | Showghi et al. |
| 6,494,367 B1 | 12/2002 | Zacharias |

(56) References Cited

U.S. PATENT DOCUMENTS

| | | |
|---|---|---|
| 6,502,745 B1 | 1/2003 | Stimson et al. |
| 6,507,823 B1 | 1/2003 | Nel |
| 6,529,956 B1 | 3/2003 | Smith |
| 6,536,659 B1 | 3/2003 | Hauser |
| 6,542,933 B1 | 4/2003 | Durst, Jr. et al. |
| 6,550,672 B1 | 4/2003 | Tracy et al. |
| 6,575,361 B1 | 6/2003 | Graves et al. |
| 6,581,827 B2 | 6/2003 | Welton |
| 6,591,098 B1 | 7/2003 | Shieh et al. |
| 6,594,640 B1 | 7/2003 | Postrel |
| 6,594,644 B1 | 7/2003 | Van Dusen |
| 6,609,113 B1 | 8/2003 | O'Leary et al. |
| 6,615,189 B1 | 9/2003 | Phillips et al. |
| 6,615,190 B1 | 9/2003 | Slater |
| 6,622,015 B1 | 9/2003 | Himmel et al. |
| 6,636,833 B1 | 10/2003 | Flitcroft et al. |
| 6,648,222 B2 | 11/2003 | McDonald et al. |
| 6,651,885 B1 | 11/2003 | Arias |
| 6,659,259 B2 | 12/2003 | Knox et al. |
| 6,678,664 B1 | 1/2004 | Ganesan |
| 6,684,269 B2 | 1/2004 | Wagner |
| 6,705,520 B1 | 3/2004 | Pitroda et al. |
| 6,745,022 B2 | 6/2004 | Knox |
| 6,769,607 B1 | 8/2004 | Pitroda et al. |
| 6,805,289 B2 | 10/2004 | Noriega et al. |
| 6,807,410 B1 | 10/2004 | Pailles et al. |
| 6,819,219 B1 | 11/2004 | Bolle et al. |
| 6,827,260 B2 | 12/2004 | Stoutenburg et al. |
| 6,829,596 B1 | 12/2004 | Frazee |
| 6,836,765 B1 | 12/2004 | Sussman |
| 6,836,962 B2 | 1/2005 | Khandros et al. |
| 6,839,692 B2 | 1/2005 | Carrott et al. |
| 6,839,744 B1 | 1/2005 | Kloba et al. |
| 6,848,613 B2 | 2/2005 | Nielsen et al. |
| 6,856,974 B1 | 2/2005 | Ganesan et al. |
| 6,862,575 B1 | 3/2005 | Anttila |
| 6,868,391 B1 | 3/2005 | Hultgren |
| 6,882,984 B1 | 4/2005 | Boyle et al. |
| 6,899,621 B2 | 5/2005 | Behm |
| 6,915,277 B1 | 7/2005 | Manchester |
| 6,918,537 B2 | 7/2005 | Graves et al. |
| 6,925,439 B1 | 8/2005 | Pitroda |
| 6,932,268 B1 | 8/2005 | McCoy et al. |
| 6,934,529 B2 | 8/2005 | Bagoren et al. |
| 6,934,689 B1 | 8/2005 | Ritter et al. |
| 6,941,270 B1 | 9/2005 | Hannula |
| 6,948,063 B1 | 9/2005 | Ganesan et al. |
| 6,961,412 B2 | 11/2005 | Ruckart et al. |
| 6,965,866 B2 | 11/2005 | Klein |
| 6,975,937 B1 | 12/2005 | Kantarjiev et al. |
| 6,988,657 B1 | 1/2006 | Singer et al. |
| 6,993,510 B2 | 1/2006 | Guy et al. |
| 7,014,107 B2 | 3/2006 | Singer et al. |
| 7,016,863 B2 | 3/2006 | Kamakura et al. |
| 7,024,174 B2 | 4/2006 | Nagy et al. |
| 7,024,396 B2 | 4/2006 | Woodward |
| 7,054,842 B2 | 5/2006 | James et al. |
| 7,055,740 B1 | 6/2006 | Schultz |
| 7,069,248 B2 | 6/2006 | Huber |
| 7,072,854 B2 | 7/2006 | Loeser |
| 7,072,864 B2 | 7/2006 | Brake, Jr. et al. |
| 7,083,084 B2 | 8/2006 | Graves et al. |
| 7,085,931 B1 | 8/2006 | Smith et al. |
| 7,086,584 B2 | 8/2006 | Stoutenburg et al. |
| 7,093,761 B2 | 8/2006 | Smith et al. |
| 7,117,227 B2 | 10/2006 | Call |
| 7,128,274 B2 | 10/2006 | Kelley et al. |
| 7,130,817 B2 | 10/2006 | Karas et al. |
| 7,131,582 B2 | 11/2006 | Welton |
| 7,143,055 B1 | 11/2006 | Perkowski |
| 7,162,440 B2 | 1/2007 | Koons |
| 7,165,052 B2 | 1/2007 | Diveley et al. |
| 7,182,252 B1 | 2/2007 | Cooper et al. |
| 7,194,438 B2 | 3/2007 | Sovio et al. |
| 7,209,889 B1 | 4/2007 | Whitfield |
| 7,209,890 B1 | 4/2007 | Peon et al. |
| 7,216,092 B1 | 5/2007 | Weber |
| 7,222,101 B2 | 5/2007 | Bishop et al. |
| 7,229,006 B2 | 6/2007 | Babbi et al. |
| 7,229,014 B1 | 6/2007 | Snyder |
| 7,243,839 B2 | 7/2007 | Beck et al. |
| 7,249,054 B2 | 7/2007 | Keil |
| 7,249,097 B2 | 7/2007 | Hutchison et al. |
| 7,269,256 B2 | 9/2007 | Rosen |
| 7,292,998 B2 | 11/2007 | Graves et al. |
| 7,316,350 B2 | 1/2008 | Algiene |
| 7,328,190 B2 | 2/2008 | Smith et al. |
| 7,333,955 B2 | 2/2008 | Graves et al. |
| 7,356,327 B2 | 4/2008 | Cai et al. |
| 7,363,265 B2 | 4/2008 | Horgan |
| 7,370,012 B2 | 5/2008 | Karns et al. |
| 7,376,431 B2 | 5/2008 | Niedermeyer |
| 7,383,226 B2 | 6/2008 | Kight et al. |
| 7,398,248 B2 | 7/2008 | Phillips et al. |
| 7,400,883 B2 | 7/2008 | Rivers et al. |
| 7,415,617 B2 | 8/2008 | Ginter et al. |
| 7,437,328 B2 | 10/2008 | Graves et al. |
| 7,494,417 B2 | 2/2009 | Walker |
| 7,519,543 B2 | 4/2009 | Ota et al. |
| 7,536,349 B1 | 5/2009 | Mik et al. |
| 7,566,000 B2 | 7/2009 | Agostino et al. |
| 7,590,557 B2 | 9/2009 | Harrison et al. |
| 7,631,803 B2 | 12/2009 | Peyret et al. |
| 7,650,308 B2 | 1/2010 | Nguyen et al. |
| 7,702,542 B2 | 4/2010 | Aslanian |
| 7,711,598 B2 | 5/2010 | Perkowski |
| 7,725,326 B1 | 5/2010 | Tracy et al. |
| 7,735,724 B2 | 6/2010 | Fujita et al. |
| 7,747,644 B2 | 6/2010 | Reihl |
| 7,757,944 B2 | 7/2010 | Cline et al. |
| 7,774,209 B2 | 8/2010 | James et al. |
| 7,840,437 B2 | 11/2010 | Lewis |
| 7,848,948 B2 | 12/2010 | Perkowski et al. |
| 7,866,548 B2 | 1/2011 | Reed et al. |
| 7,904,333 B1 | 3/2011 | Perkowski |
| 7,905,399 B2 | 3/2011 | Barnes |
| 7,917,386 B2 | 3/2011 | Christensen |
| 7,940,333 B2 | 5/2011 | Suzuki |
| 7,941,373 B1 | 5/2011 | Chang et al. |
| 7,959,076 B1 | 6/2011 | Hopkins, III |
| 8,046,268 B2 | 10/2011 | Hunt |
| 8,060,413 B2 | 11/2011 | Castell et al. |
| 8,103,520 B2 | 1/2012 | Mueller |
| 8,109,436 B1 | 2/2012 | Hopkins, III |
| 8,195,568 B2 | 6/2012 | Singhal |
| 8,332,323 B2 | 12/2012 | Stals et al. |
| 8,352,627 B1 | 1/2013 | Harris |
| 8,355,982 B2 | 1/2013 | Hazel et al. |
| 8,396,758 B2 | 3/2013 | Paradise |
| 8,509,814 B1 | 8/2013 | Parker |
| 8,577,735 B2 | 11/2013 | Wilen |
| 8,636,203 B1 | 1/2014 | Patterson |
| 8,662,387 B1 | 3/2014 | Geller et al. |
| 8,712,835 B1 | 4/2014 | Philyaw |
| 8,751,298 B1 | 6/2014 | Giordano et al. |
| 8,768,834 B2 | 7/2014 | Zacarias et al. |
| 9,098,190 B2 | 8/2015 | Zhou |
| 9,183,534 B2 | 11/2015 | Gharabally |
| 9,449,343 B2* | 9/2016 | Mayerle .............. G06Q 30/0643 |
| 9,483,786 B2 | 11/2016 | Glass |
| 9,626,070 B2* | 4/2017 | Cowles ............... G06F 3/04845 |
| 9,672,687 B2 | 6/2017 | Cage |
| 10,262,346 B2 | 4/2019 | Glass |
| 10,515,397 B2* | 12/2019 | Serfass ................... G06T 17/00 |
| 10,679,268 B1* | 6/2020 | Kochhar ............ G06Q 30/0643 |
| 2001/0001321 A1 | 5/2001 | Resnick et al. |
| 2001/0001856 A1 | 5/2001 | Gould et al. |
| 2001/0005840 A1 | 6/2001 | Verkama |
| 2001/0007983 A1 | 7/2001 | Lee |
| 2001/0011248 A1 | 8/2001 | Himmel et al. |
| 2001/0032878 A1 | 10/2001 | Tsiounis et al. |
| 2001/0034707 A1 | 10/2001 | Sakaguchi |
| 2001/0037264 A1 | 11/2001 | Husemann et al. |
| 2001/0042784 A1 | 11/2001 | Fite et al. |

(56) References Cited

U.S. PATENT DOCUMENTS

| | | |
|---|---|---|
| 2001/0044776 A1 | 11/2001 | Kight et al. |
| 2001/0056410 A1 | 12/2001 | Ishigaki |
| 2002/0002535 A1 | 1/2002 | Kitchen et al. |
| 2002/0010627 A1 | 1/2002 | Lerat |
| 2002/0010677 A1 | 1/2002 | Kitchen et al. |
| 2002/0013768 A1 | 1/2002 | Ganesan |
| 2002/0019809 A1 | 2/2002 | Kitchen et al. |
| 2002/0022472 A1 | 2/2002 | Watler et al. |
| 2002/0046165 A1 | 4/2002 | Kitchen et al. |
| 2002/0046166 A1 | 4/2002 | Kitchen et al. |
| 2002/0046167 A1 | 4/2002 | Kitchen et al. |
| 2002/0046168 A1 | 4/2002 | Kitchen et al. |
| 2002/0049672 A1 | 4/2002 | Kitchen et al. |
| 2002/0052840 A1 | 5/2002 | Kitchen et al. |
| 2002/0052841 A1 | 5/2002 | Guthrie et al. |
| 2002/0060243 A1 | 5/2002 | Janiak et al. |
| 2002/0062249 A1 | 5/2002 | Ianacci |
| 2002/0062282 A1 | 5/2002 | Kight et al. |
| 2002/0065713 A1 | 5/2002 | Awada et al. |
| 2002/0065773 A1 | 5/2002 | Kight et al. |
| 2002/0065774 A1 | 5/2002 | Young et al. |
| 2002/0077076 A1 | 6/2002 | Suryanarayana et al. |
| 2002/0077993 A1 | 6/2002 | Immonen et al. |
| 2002/0088855 A1 | 7/2002 | Hodes |
| 2002/0091573 A1 | 7/2002 | Hodes |
| 2002/0101966 A1 | 8/2002 | Nelson |
| 2002/0107791 A1 | 8/2002 | Nobrega et al. |
| 2002/0111906 A1 | 8/2002 | Garrison et al. |
| 2002/0115424 A1 | 8/2002 | Bagoren et al. |
| 2002/0116329 A1 | 8/2002 | Serbetcioglu et al. |
| 2002/0116531 A1 | 8/2002 | Chu |
| 2002/0119767 A1 | 8/2002 | Fieldhouse et al. |
| 2002/0120571 A1 | 8/2002 | Maung et al. |
| 2002/0128968 A1 | 9/2002 | Kitchen et al. |
| 2002/0138450 A1 | 9/2002 | Kremer |
| 2002/0138573 A1 | 9/2002 | Saguy |
| 2002/0152123 A1 | 10/2002 | Giordano et al. |
| 2002/0152160 A1 | 10/2002 | Allen-Rouman et al. |
| 2002/0152179 A1 | 10/2002 | Racov |
| 2002/0153414 A1 | 10/2002 | Stoutenburg et al. |
| 2002/0161631 A1 | 10/2002 | Banerjee et al. |
| 2002/0169713 A1 | 11/2002 | Chang et al. |
| 2002/0178062 A1 | 11/2002 | Wright et al. |
| 2002/0190123 A1 | 12/2002 | Anvekar et al. |
| 2002/0198722 A1 | 12/2002 | Yuschik |
| 2003/0001005 A1 | 1/2003 | Risafi et al. |
| 2003/0004802 A1 | 1/2003 | Callegari |
| 2003/0004891 A1 | 1/2003 | Rensburg et al. |
| 2003/0004894 A1 | 1/2003 | Rowney et al. |
| 2003/0009382 A1 | 1/2003 | D'Arbeloff |
| 2003/0023552 A1 | 1/2003 | Kight et al. |
| 2003/0028481 A1 | 2/2003 | Flitcroft et al. |
| 2003/0033246 A1 | 2/2003 | Slater |
| 2003/0055735 A1 | 3/2003 | Cameron et al. |
| 2003/0055782 A1 | 3/2003 | Slater |
| 2003/0070080 A1 | 4/2003 | Rosen |
| 2003/0074328 A1 | 4/2003 | Schiff et al. |
| 2003/0093366 A1 | 5/2003 | Halper et al. |
| 2003/0105672 A1 | 6/2003 | Epstein et al. |
| 2003/0105688 A1 | 6/2003 | Brown et al. |
| 2003/0115126 A1 | 6/2003 | Pitroda |
| 2003/0121967 A1 | 7/2003 | Goldberg et al. |
| 2003/0126079 A1 | 7/2003 | Roberson et al. |
| 2003/0141358 A1 | 7/2003 | Hudson et al. |
| 2003/0162565 A1 | 8/2003 | Al-Khaja |
| 2003/0163787 A1 | 8/2003 | Hay et al. |
| 2003/0172039 A1 | 9/2003 | Guy et al. |
| 2003/0191711 A1 | 10/2003 | Jamison et al. |
| 2003/0197059 A1 | 10/2003 | Tidball et al. |
| 2003/0200179 A1 | 10/2003 | Kwan |
| 2003/0200184 A1 | 10/2003 | Dominguez et al. |
| 2003/0212601 A1 | 11/2003 | Silva et al. |
| 2003/0218062 A1 | 11/2003 | Noriega et al. |
| 2003/0218066 A1 | 11/2003 | Fernandes et al. |
| 2003/0220884 A1 | 11/2003 | Choi et al. |
| 2003/0226042 A1 | 12/2003 | Fukushima |
| 2003/0229590 A1 | 12/2003 | Byrne et al. |
| 2003/0233317 A1 | 12/2003 | Judd |
| 2003/0233318 A1 | 12/2003 | King et al. |
| 2003/0234819 A1 | 12/2003 | Daly et al. |
| 2003/0236704 A1 | 12/2003 | Antonucci |
| 2004/0009760 A1 | 1/2004 | Laybourn et al. |
| 2004/0010462 A1 | 1/2004 | Moon et al. |
| 2004/0019564 A1 | 1/2004 | Goldthwaite et al. |
| 2004/0019568 A1 | 1/2004 | Moenickheim et al. |
| 2004/0029569 A1 | 2/2004 | Khan et al. |
| 2004/0046035 A1 | 3/2004 | Davila et al. |
| 2004/0049456 A1 | 3/2004 | Dreyer |
| 2004/0049458 A1 | 3/2004 | Kunugi et al. |
| 2004/0054587 A1 | 3/2004 | Dev et al. |
| 2004/0059671 A1 | 3/2004 | Nozaki et al. |
| 2004/0064409 A1 | 4/2004 | Kight et al. |
| 2004/0068446 A1 | 4/2004 | Do et al. |
| 2004/0068448 A1 | 4/2004 | Kim |
| 2004/0078327 A1 | 4/2004 | Frazier et al. |
| 2004/0078332 A1 | 4/2004 | Ferguson et al. |
| 2004/0083170 A1 | 4/2004 | Bam et al. |
| 2004/0083171 A1 | 4/2004 | Kight et al. |
| 2004/0093305 A1 | 5/2004 | Kight et al. |
| 2004/0094624 A1 | 5/2004 | Fernandes et al. |
| 2004/0107170 A1 | 6/2004 | Labrou et al. |
| 2004/0114766 A1 | 6/2004 | Hileman et al. |
| 2004/0117302 A1 | 6/2004 | Weichert et al. |
| 2004/0118914 A1 | 6/2004 | Smith et al. |
| 2004/0128197 A1 | 7/2004 | Bam et al. |
| 2004/0139005 A1 | 7/2004 | Ganesan |
| 2004/0159700 A1 | 8/2004 | Khan et al. |
| 2004/0162058 A1 | 8/2004 | Mottes |
| 2004/0167853 A1 | 8/2004 | Sharma |
| 2004/0181463 A1 | 9/2004 | Goldthwaite et al. |
| 2004/0185881 A1 | 9/2004 | Lee |
| 2004/0193464 A1 | 9/2004 | Szrek |
| 2004/0199431 A1 | 10/2004 | Ganesan et al. |
| 2004/0199474 A1 | 10/2004 | Ritter |
| 2004/0205023 A1 | 10/2004 | Hafer et al. |
| 2004/0205138 A1 | 10/2004 | Friedman et al. |
| 2004/0210449 A1 | 10/2004 | Breck et al. |
| 2004/0215560 A1 | 10/2004 | Amalraj et al. |
| 2004/0215564 A1 | 10/2004 | Lawlor et al. |
| 2004/0215573 A1 | 10/2004 | Teutenberg et al. |
| 2004/0224660 A1 | 11/2004 | Anderson |
| 2004/0225560 A1 | 11/2004 | Lewis et al. |
| 2004/0230489 A1 | 11/2004 | Goldthwaite et al. |
| 2004/0232225 A1 | 11/2004 | Bishop et al. |
| 2004/0242208 A1 | 12/2004 | Teicher |
| 2004/0243490 A1 | 12/2004 | Murto et al. |
| 2004/0249710 A1 | 12/2004 | Smith et al. |
| 2004/0249766 A1 | 12/2004 | Ganesan et al. |
| 2004/0267663 A1 | 12/2004 | Karns |
| 2004/0267664 A1 | 12/2004 | Nam et al. |
| 2004/0267665 A1 | 12/2004 | Nam et al. |
| 2005/0001027 A1 | 1/2005 | Bahar |
| 2005/0004837 A1 | 1/2005 | Sweeny |
| 2005/0015388 A1 | 1/2005 | Dasgupta et al. |
| 2005/0021457 A1 | 1/2005 | Johnson et al. |
| 2005/0027624 A1 | 2/2005 | Cai |
| 2005/0027655 A1 | 2/2005 | Sharma et al. |
| 2005/0033645 A1 | 2/2005 | DuPhily |
| 2005/0051619 A1 | 3/2005 | Graves et al. |
| 2005/0060261 A1 | 3/2005 | Remington et al. |
| 2005/0061872 A1 | 3/2005 | Paschini et al. |
| 2005/0065876 A1 | 3/2005 | Kumar |
| 2005/0071179 A1 | 3/2005 | Peters et al. |
| 2005/0071269 A1 | 3/2005 | Peters |
| 2005/0075958 A1 | 4/2005 | Gonzalez |
| 2005/0075975 A1 | 4/2005 | Rosner et al. |
| 2005/0079863 A1 | 4/2005 | Macaluso |
| 2005/0080634 A1 | 4/2005 | Kanniainen et al. |
| 2005/0080727 A1 | 4/2005 | Postrel |
| 2005/0086164 A1 | 4/2005 | Kim et al. |
| 2005/0086168 A1 | 4/2005 | Alvarez |
| 2005/0096981 A1 | 5/2005 | Shimada |
| 2005/0097038 A1 | 5/2005 | Yu et al. |
| 2005/0103839 A1 | 5/2005 | Hewel |

(56) References Cited

U.S. PATENT DOCUMENTS

| | | |
|---|---|---|
| 2005/0107068 A1 | 5/2005 | Smith et al. |
| 2005/0109835 A1 | 5/2005 | Jacoby et al. |
| 2005/0116028 A1 | 6/2005 | Cotten |
| 2005/0125343 A1 | 6/2005 | Mendelovich |
| 2005/0125348 A1 | 6/2005 | Fulton et al. |
| 2005/0127169 A1 | 6/2005 | Foss |
| 2005/0137978 A1 | 6/2005 | Ganesan et al. |
| 2005/0143051 A1 | 6/2005 | Park |
| 2005/0154644 A1 | 7/2005 | Deakin et al. |
| 2005/0174975 A1 | 8/2005 | Mgrdechian et al. |
| 2005/0177437 A1 | 8/2005 | Ferrier |
| 2005/0177517 A1 | 8/2005 | Leung |
| 2005/0182714 A1 | 8/2005 | Nel |
| 2005/0182720 A1 | 8/2005 | Willard et al. |
| 2005/0184145 A1 | 8/2005 | Law et al. |
| 2005/0187873 A1 | 8/2005 | Labrou et al. |
| 2005/0199709 A1 | 9/2005 | Linlor |
| 2005/0203835 A1 | 9/2005 | Nhaissi et al. |
| 2005/0203844 A1 | 9/2005 | Ferguson et al. |
| 2005/0209965 A1 | 9/2005 | Ganesan |
| 2005/0222925 A1 | 10/2005 | Jamieson |
| 2005/0222961 A1 | 10/2005 | Staib et al. |
| 2005/0228717 A1 | 10/2005 | Gusler et al. |
| 2005/0233797 A1 | 10/2005 | Gilmore |
| 2005/0240477 A1 | 10/2005 | Friday |
| 2005/0247777 A1 | 11/2005 | Pitroda |
| 2005/0259589 A1 | 11/2005 | Rozmovits et al. |
| 2005/0261968 A1 | 11/2005 | Randall et al. |
| 2005/0262017 A1 | 11/2005 | Kawase et al. |
| 2005/0269401 A1 | 12/2005 | Spitzer et al. |
| 2005/0269402 A1 | 12/2005 | Spitzer et al. |
| 2005/0274793 A1 | 12/2005 | Cantini et al. |
| 2006/0000900 A1 | 1/2006 | Fernandes et al. |
| 2006/0004631 A1 | 1/2006 | Roberts et al. |
| 2006/0004656 A1 | 1/2006 | Lee |
| 2006/0006226 A1 | 1/2006 | Fitzgerald et al. |
| 2006/0023856 A1 | 2/2006 | Welton |
| 2006/0026070 A1 | 2/2006 | Sun |
| 2006/0037835 A1 | 2/2006 | Doran |
| 2006/0041470 A1 | 2/2006 | Filho et al. |
| 2006/0053056 A1 | 3/2006 | Alspach-Goss et al. |
| 2006/0058011 A1 | 3/2006 | Vanska et al. |
| 2006/0074767 A1 | 4/2006 | Fortney et al. |
| 2006/0080232 A1 | 4/2006 | Epps |
| 2006/0085310 A1 | 4/2006 | Mylet et al. |
| 2006/0089160 A1 | 4/2006 | Othmer |
| 2006/0089893 A1 | 4/2006 | Joseph et al. |
| 2006/0113376 A1 | 6/2006 | Reed et al. |
| 2006/0116892 A1 | 6/2006 | Grimes et al. |
| 2006/0136334 A1 | 6/2006 | Atkinson et al. |
| 2006/0136901 A1 | 6/2006 | Nichols |
| 2006/0161490 A1 | 7/2006 | Chakiris et al. |
| 2006/0163343 A1 | 7/2006 | Changryeol |
| 2006/0167744 A1 | 7/2006 | Yoo |
| 2006/0206436 A1 | 9/2006 | James et al. |
| 2006/0207856 A1 | 9/2006 | Dean et al. |
| 2006/0224450 A1 | 10/2006 | Moon |
| 2006/0235754 A1 | 10/2006 | Walker et al. |
| 2006/0253320 A1 | 11/2006 | Heywood |
| 2006/0255125 A1 | 11/2006 | Jennings et al. |
| 2007/0017976 A1 | 1/2007 | Peyret et al. |
| 2007/0021969 A1 | 1/2007 | Homeier-Beals |
| 2007/0030824 A1 | 2/2007 | Ribaudo |
| 2007/0038577 A1 | 2/2007 | Werner |
| 2007/0043682 A1 | 2/2007 | Drapkin et al. |
| 2007/0055785 A1 | 3/2007 | Stevens |
| 2007/0063024 A1 | 3/2007 | Guillot |
| 2007/0156436 A1 | 4/2007 | Fisher |
| 2007/0100761 A1 | 5/2007 | Dillon |
| 2007/0108269 A1 | 5/2007 | Benco et al. |
| 2007/0114274 A1 | 5/2007 | Gibbs et al. |
| 2007/0118478 A1 | 5/2007 | Graves et al. |
| 2007/0125838 A1 | 6/2007 | Law et al. |
| 2007/0130085 A1 | 6/2007 | Zhu |
| 2007/0162337 A1 | 7/2007 | Hawkins et al. |
| 2007/0174123 A1 | 7/2007 | Dorr |
| 2007/0175984 A1 | 8/2007 | Khandaker et al. |
| 2007/0192182 A1 | 8/2007 | Monaco |
| 2007/0198347 A1 | 8/2007 | Muldoon |
| 2007/0208618 A1 | 9/2007 | Paintin et al. |
| 2007/0233615 A1 | 10/2007 | Tumminaro |
| 2007/0257767 A1 | 11/2007 | Beeson |
| 2007/0262140 A1 | 11/2007 | Long |
| 2007/0265872 A1 | 11/2007 | Robinson et al. |
| 2007/0284434 A1 | 12/2007 | Fletcher |
| 2008/0006685 A1 | 1/2008 | Rackley, III et al. |
| 2008/0010190 A1 | 1/2008 | Rackley, III et al. |
| 2008/0010191 A1 | 1/2008 | Rackley, III et al. |
| 2008/0010192 A1 | 1/2008 | Rackley, III et al. |
| 2008/0010193 A1 | 1/2008 | Rackley, III et al. |
| 2008/0010196 A1 | 1/2008 | Rackley, III et al. |
| 2008/0010204 A1 | 1/2008 | Rackley, III et al. |
| 2008/0010215 A1 | 1/2008 | Rackley, III et al. |
| 2008/0028395 A1 | 1/2008 | Motta et al. |
| 2008/0033817 A1 | 2/2008 | Billmaier et al. |
| 2008/0040265 A1 | 2/2008 | Rackley, III et al. |
| 2008/0041938 A1 | 2/2008 | Wise |
| 2008/0046366 A1 | 2/2008 | Bemmel et al. |
| 2008/0052164 A1 | 2/2008 | Abifaker |
| 2008/0052169 A1 | 2/2008 | O'Shea et al. |
| 2008/0059318 A1 | 3/2008 | Packes et al. |
| 2008/0070690 A1 | 3/2008 | Luchene et al. |
| 2008/0071620 A1 | 3/2008 | Lowe |
| 2008/0078831 A1 | 4/2008 | Johnson et al. |
| 2008/0091545 A1 | 4/2008 | Jennings et al. |
| 2008/0097844 A1 | 4/2008 | Hsu et al. |
| 2008/0097851 A1 | 4/2008 | Bemmel et al. |
| 2008/0103972 A1 | 5/2008 | Lanc |
| 2008/0114699 A1 | 5/2008 | Yuan et al. |
| 2008/0126145 A1 | 5/2008 | Rackley, III et al. |
| 2008/0133351 A1 | 6/2008 | White et al. |
| 2008/0172306 A1 | 7/2008 | Schorr et al. |
| 2008/0172331 A1 | 7/2008 | Graves et al. |
| 2008/0179395 A1 | 7/2008 | Dixon et al. |
| 2008/0228597 A1 | 9/2008 | Sondles |
| 2008/0235095 A1 | 9/2008 | Oles et al. |
| 2008/0255942 A1 | 10/2008 | Craft |
| 2008/0273630 A1 | 11/2008 | Mege et al. |
| 2008/0290987 A1 | 11/2008 | Li |
| 2008/0319868 A1 | 12/2008 | Briscoe |
| 2009/0001159 A1 | 1/2009 | James et al. |
| 2009/0006116 A1 | 1/2009 | Baker et al. |
| 2009/0030789 A1 | 1/2009 | Mashinsky |
| 2009/0037326 A1 | 2/2009 | Chitti et al. |
| 2009/0055296 A1 | 2/2009 | Nelsen |
| 2009/0076896 A1 | 3/2009 | Dewitt |
| 2009/0106115 A1 | 4/2009 | James et al. |
| 2009/0111378 A1 | 4/2009 | Sheynman |
| 2009/0112709 A1 | 4/2009 | Barhydt et al. |
| 2009/0144161 A1 | 6/2009 | Fisher |
| 2009/0157554 A1 | 6/2009 | Hobson et al. |
| 2009/0163263 A1 | 6/2009 | Herndon |
| 2009/0164329 A1 | 6/2009 | Bishop et al. |
| 2009/0171739 A1 | 7/2009 | De et al. |
| 2009/0171804 A1 | 7/2009 | Lee et al. |
| 2009/0173782 A1 | 7/2009 | Muscato |
| 2009/0173784 A1 | 7/2009 | Yang |
| 2009/0187491 A1 | 7/2009 | Bull |
| 2009/0192904 A1 | 7/2009 | Patterson et al. |
| 2009/0192928 A1 | 7/2009 | Abifaker |
| 2009/0197684 A1 | 8/2009 | Arezina |
| 2009/0240579 A1 | 9/2009 | Skowreonek |
| 2009/0247131 A1 | 10/2009 | Champion |
| 2009/0254453 A1 | 10/2009 | Sanguinetti et al. |
| 2009/0281915 A1 | 11/2009 | Deakin et al. |
| 2009/0281941 A1 | 11/2009 | Worth |
| 2009/0281951 A1 | 11/2009 | Shakkarwar |
| 2009/0287558 A1 | 11/2009 | Seth et al. |
| 2009/0298427 A1 | 12/2009 | Wilkinson |
| 2009/0327121 A1 | 12/2009 | Carroll et al. |
| 2010/0005025 A1 | 1/2010 | Kumar et al. |
| 2010/0005424 A1 | 1/2010 | Sundaresan |
| 2010/0008535 A1 | 1/2010 | Abulafia et al. |
| 2010/0010906 A1 | 1/2010 | Grecia |

(56) References Cited

U.S. PATENT DOCUMENTS

| | | |
|---|---|---|
| 2010/0041368 A1 | 2/2010 | Kumar |
| 2010/0042471 A1 | 2/2010 | Chang et al. |
| 2010/0063906 A1 | 3/2010 | Nelsen et al. |
| 2010/0076833 A1 | 3/2010 | Nelsen |
| 2010/0082487 A1 | 4/2010 | Nelsen |
| 2010/0082490 A1 | 4/2010 | Rosenblatt |
| 2010/0088188 A1 | 4/2010 | Kumar et al. |
| 2010/0097180 A1 | 4/2010 | Cardullo |
| 2010/0130172 A1 | 5/2010 | Vendrow et al. |
| 2010/0131415 A1 | 5/2010 | Sartipi |
| 2010/0174993 A1 | 7/2010 | Pennington et al. |
| 2010/0175287 A1 | 7/2010 | Gupta et al. |
| 2010/0185505 A1 | 7/2010 | Sprogoe et al. |
| 2010/0205063 A1 | 8/2010 | Mersky |
| 2010/0280921 A1 | 11/2010 | Stone et al. |
| 2010/0293536 A1 | 11/2010 | Nikitin |
| 2010/0299194 A1 | 11/2010 | Snyder et al. |
| 2010/0299266 A1 | 11/2010 | Catania et al. |
| 2010/0304852 A1 | 12/2010 | Szrek |
| 2011/0057027 A1 | 3/2011 | Grossman |
| 2011/0087592 A1 | 4/2011 | Veen et al. |
| 2011/0091092 A1 | 4/2011 | Nepomniachtchi et al. |
| 2011/0106698 A1 | 5/2011 | Isaacson |
| 2011/0125607 A1 | 5/2011 | Wilen |
| 2011/0145044 A1 | 6/2011 | Nelsen et al. |
| 2011/0161226 A1 | 6/2011 | Courtion |
| 2011/0173083 A1 | 7/2011 | Reed et al. |
| 2011/0202419 A1 | 8/2011 | Mamdani |
| 2011/0234514 A1 | 9/2011 | Gothard |
| 2011/0246284 A1 | 10/2011 | Chaikin |
| 2011/0251962 A1 | 10/2011 | Hruska |
| 2012/0004769 A1 | 1/2012 | Hallenbeck et al. |
| 2012/0060425 A1 | 3/2012 | Yamauchi et al. |
| 2012/0089467 A1 | 4/2012 | Comparelli |
| 2012/0099780 A1 | 4/2012 | Smith et al. |
| 2012/0136780 A1 | 5/2012 | El-Awady |
| 2012/0203572 A1 | 8/2012 | Christense |
| 2012/0209688 A1 | 8/2012 | Lamothe et al. |
| 2012/0234911 A1 | 9/2012 | Yankovich et al. |
| 2012/0245987 A1 | 9/2012 | Isaacson |
| 2012/0271689 A1 | 10/2012 | Etheredge et al. |
| 2012/0284185 A1 | 11/2012 | Mettler et al. |
| 2012/0303425 A1 | 11/2012 | Katzin |
| 2013/0073388 A1 | 3/2013 | Heath |
| 2013/0226728 A1 | 8/2013 | Oghittu |
| 2013/0290121 A1 | 10/2013 | Simakov |
| 2013/0304561 A1 | 11/2013 | Warner et al. |
| 2014/0006268 A1 | 1/2014 | Roberts |
| 2014/0019238 A1 | 1/2014 | Blatchley |
| 2014/0058873 A1 | 2/2014 | Sorenson |
| 2014/0074704 A1 | 3/2014 | White |
| 2014/0297437 A1 | 3/2014 | Natarajan |
| 2014/0164159 A1 | 6/2014 | Lovelace |
| 2014/0237578 A1* | 8/2014 | Bryant ................ G06F 3/04842 715/753 |
| 2014/0081769 A1 | 11/2014 | Wilen |
| 2014/0279187 A1 | 11/2014 | Gopinath |
| 2015/0066757 A1 | 3/2015 | Shenoy |
| 2015/0106225 A1* | 4/2015 | Glass ................ G06Q 30/0641 705/26.7 |
| 2015/0178701 A1 | 6/2015 | Glass |
| 2015/0278845 A1 | 10/2015 | Sorem et al. |
| 2016/0232480 A1* | 8/2016 | Erez ..................... G06Q 20/12 |
| 2017/0076293 A1 | 3/2017 | Cage |

FOREIGN PATENT DOCUMENTS

| | | | |
|---|---|---|---|
| EP | 2128809 A1 | 12/2009 | |
| JP | 2002189963 A | 7/2002 | |
| JP | 2002318951 A | 10/2002 | |
| JP | 2003208541 A | 7/2003 | |
| KR | 20010106187 A | 11/2001 | |
| KR | 20040028487 A | 4/2004 | |
| KR | 20040052531 A | 6/2004 | |
| KR | 1020040052502 A | 6/2004 | |
| KR | 20040069294 A | 8/2004 | |
| KR | 20050118609 A | 12/2005 | |
| KR | 20090123444 A | 12/2009 | |
| WO | 2004012118 A1 | 2/2004 | |
| WO | 2005111882 A1 | 11/2005 | |
| WO | 2008005018 A9 | 1/2010 | |
| WO | 2013078499 A1 | 6/2013 | |
| WO | WO-2014015365 A1 * | 1/2014 | ............. G06Q 30/06 |

OTHER PUBLICATIONS

Eazel, William, "Paypal intros SMS Payments," http://www.v3co.uk/articles/print/2152694, vnunet.com, Mar. 24, 2006, 1 page.

International Search Report of PCT/US 13/23945, dated Mar. 29, 2013; 2 pages.

ISA European Patent Office, Search Report of EP09812328.4, dated Jul. 4, 2012, Germany, 6 pages.

ISA Korea, International Search Report of PCT/US2009/056118, dated Apr. 19, 2010, 3 pages.

ISA Korea, International Search Report of PCT/US2009/058111, dated May 26, 2010, 3 pages.

ISA Korean Intellectual Property Office, International Search Report of PCT/US2010/060875, dated Jul. 29, 2011, 10 pages.

ISA United States Patent and Trademark Office, International Search Report of PCT/US2008/073910, dated Nov. 10, 2008.

Nelsen, David A., "Systems and Methods to Manage and Control Use of a Virtual Card," U.S. Appl. No. 13/158,349, filed Jun. 10, 2011, 62 pages.

* cited by examiner

AUGMENTED REALITY GIFTING ON A MOBILE DEVICE

RELATED APPLICATIONS

This non-provisional patent application claims priority benefit, with regard to all common subject matter, of earlier-filed U.S. Provisional Patent Application No. 62/673,280, filed May 18, 2018, and entitled "AUGMENTED REALITY GIFTING ON A MOBILE DEVICE." The identified earlier-filed provisional patent application is hereby incorporated by reference in its entirety into the present application.

BACKGROUND

1. Field

Embodiments of the invention relate to presenting and receiving gifts via a mobile device. More specifically, embodiments of the invention relate to presenting and receiving gifts in an augmented reality environment presenting a virtual gift via a mobile device.

2. Related Art

Online gift giving is becoming more and more popular. Typically, gifts are purchased online and either delivered to a recipient via a parcel delivery service or in some form of digital message. The recipient may use the gift or, in the event of a stored-value card, redeem the gift at an online retailer's website or at a retail store. The problem associated with a conventional online gifting system as described is that there is no personalization. Further, these methods do not utilize technology to provide new and exciting methods of enhancing delivery and receipt of the gifts.

The Internet is being accessed more frequently by mobile devices. As this trend continues, online gift giving also is becoming a mobile-to-mobile endeavor. What is lacking in the prior art are new and innovative ways for a gift giver to customize the gift and the delivery of the gift to the recipient utilizing mobile devices and features of mobile devices. Further, what is needed, is a method for purchasing and sending a gift to a recipient that allows the gift giver and the recipient to view the gift in a particular environment before purchase. This allows both the gift giver and the recipient the ability to see how the gift will fit in with the environment and/or recipient.

SUMMARY

Embodiments of the invention solve the above-mentioned problems by providing a system and method for providing to a gift giver an application that allows the user to find and purchase a gift. A virtual gift representing the gift may then be placed in an augmented reality scene, or gifting environment, that may be an image of a location scanned on a mobile device of the user. The gifting environment may present objects suitable for presenting the gift and the gift giver may select the object or location for placement of the virtual gift. A gift recipient may receive notification via the application that the gift has been purchased or the virtual gift has been placed. The gift recipient may then search for the virtual gift receiving clues such as, for example, GPS coordinates or proximity notifications. The gift recipient may scan the gifting environment using the camera on a recipient mobile device to discover the virtual gift. The gift recipient may then choose to accept the gift by interacting with the recipient mobile device.

A first embodiment is directed to one or more non-transitory computer-readable media storing computer-executable instructions that, when executed by a processor, perform a method of presenting a virtual gift to a recipient using augmented reality, the method comprising the steps of receiving a selection of a gift from a gift giver, receiving at least one image of a gifting environment via a giver mobile device, receiving a scan of the gifting environment from a recipient mobile device, and presenting the virtual gift in a real-time scan of the gifting environment on the recipient mobile device to create the augmented reality of the gifting environment.

A second embodiment is directed to a method for selecting and presenting a virtual gift to a recipient using augmented reality, the method comprising the steps of receiving a selection of a gift from a gift giver, receiving at least one image of a gifting environment via a giver mobile device, discerning a plurality of objects from the gifting environment, determining at least one object from the plurality of objects for placement of the virtual gift, and presenting the gifting environment and the virtual gift to the gift recipient.

A third embodiment is directed to a method for presenting a gift to a recipient using augmented reality, the method comprising the steps of receiving a notification indicative of a gift for the recipient, receiving an indication of a location of at least one of a gifting environment or a virtual gift, scanning the gifting environment with a camera associated with a recipient mobile device, selecting, using the recipient mobile device, the virtual gift from the gifting environment, and viewing the gift via the recipient mobile device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

BRIEF DESCRIPTION OF THE DRAWING FIGURES

Embodiments of this disclosure are described in detail below with reference to the attached drawing figures, wherein.

Figure 1:
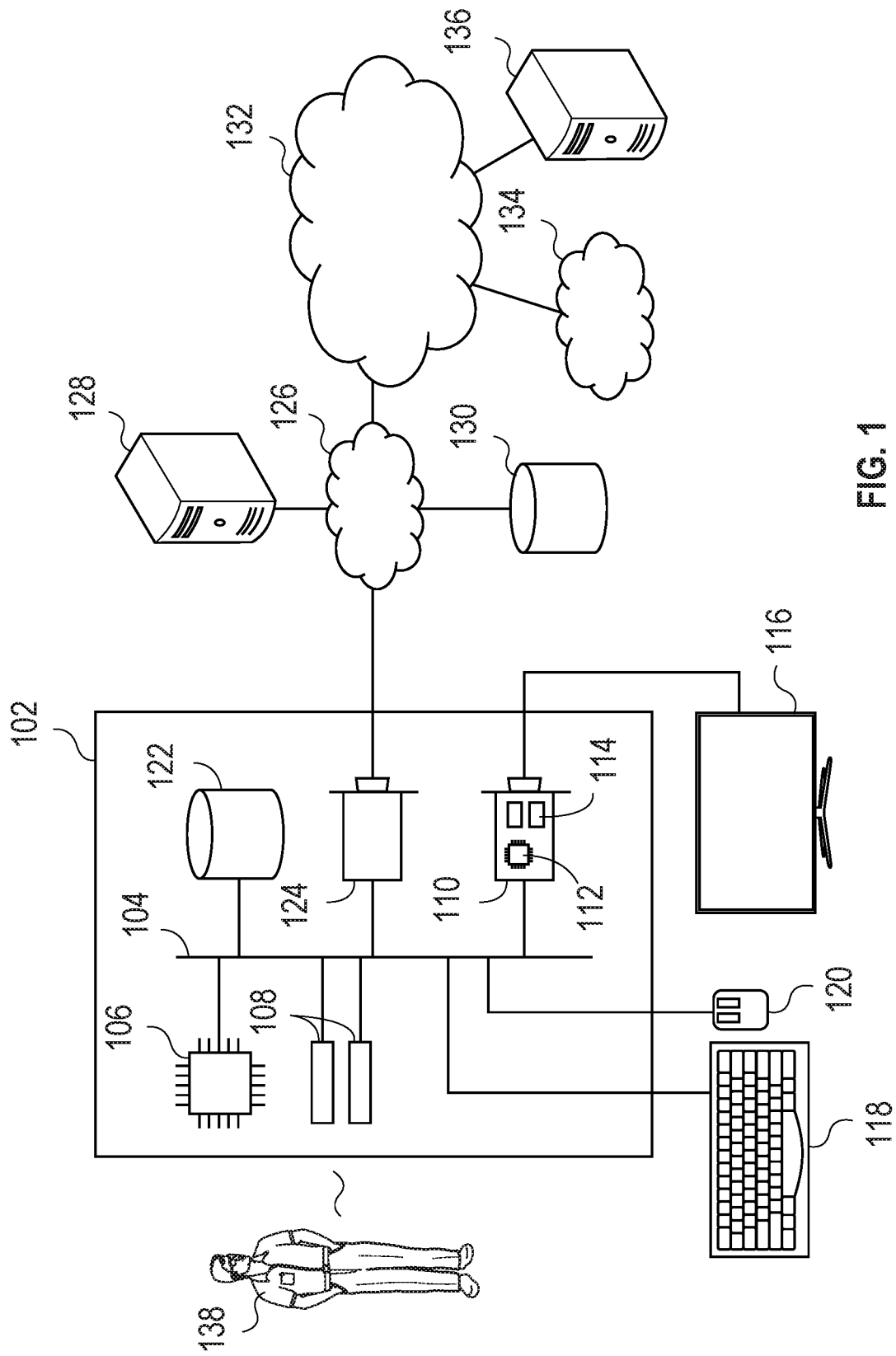
FIG. 1 depicts an embodiment of a hardware system for implementing embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiments of the invention solve the above-described problems and provide a distinct advance in the art by providing a method and system for presenting in augmented reality a virtual gift in a gifting environment on a mobile device. The virtual gift may be presented to a recipient in the gifting environment such as, for example, in an image of the user's living room on a coffee table. The user may perform an action to open the virtual gift revealing the contents therein.

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized, and changes can be made, without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Broadly speaking, embodiments of the invention provide for a recipient of an online gift to experience the fun and excitement of receiving a gift. For example, the recipient may have to hunt for the gift using an augmented reality application provided by their mobile device. A virtual gift representing the gift may be placed in the augmented reality in an imaged gifting environment. Once the user discovers the gifting environment, the user may use a camera of a mobile device to scan the gifting environment revealing the virtual gift on the mobile device display. The user may then interact with the mobile device in some way using one or more input devices or sensors of the mobile device to virtually unwrap the virtual gift revealing the gift.

Turning first to FIG. 1, an exemplary hardware platform that can form one element of certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

In some embodiments, an application may run on the computer 102 and the computer 128 which, in some embodiments, may be mobile devices or may be accessed via mobile devices and run in a web-based environment from a web browser of the user 138. The web-based environment may store data such that it is not required for the mobile device or computer to have downloaded and stored large amounts of data for the application. The application may access data such as object databases, user profiles, information related to other users, financial information, third-party financial institutions, third-party vendors, social media, or any other online service or website that is available over the internet.

In some embodiments of the invention, the application may access or store a profile of the user 138. In some embodiments, the user 138 may be a gift giver or a recipient of the gift. The user 138 may be any person or persons that access the application through any application accessible device. The application may be downloaded on the mobile device which, in some embodiments, is computer 102 or accessed via the Internet as in a cloud-based application. The user 138, in the case of a new user, may be prompted to set up a profile for use with the application. The user 138 may input such exemplary items as age, race, nationality, favorite stores, fashion trends, designers, and any information associated with a gift giver or a recipient such that the application may customize offers and provide a unique experience for the user 138. For example, the gift giver may set up an account including the user profile and submit user preferences to the application based on a recipient's likes and dislikes such that the application may provide gift suggestions based on the likes and dislikes of the recipient. Further, the gift giver or the recipient may provide access to social media sites such that the application may access the information on the social media sites of the gift giver and the recipient to determine gift suggestions. In some embodiments, the application may access any of a plurality of peripheral devices such as a camera, microphone, GPS, accelerometer, gyroscope, or any other peripheral device that may be useful in embodiments as described below.

The profile of the user 138 may also store historical information based on the actions or interactions with the application by the user 138. Financial transactions, viewed items, online searches, or any information gathered from any of the online databases mentioned above may be used to assist in creating a unique experience for the user 204. Further, a time spent viewing items may be used to determine a higher level of interest in particular items. Any items may be cross-referenced for similarities to determine other items that may be offered as gifts. The profile of the user 138 may be updated continuously such that the offers are based on the newest information from the user 138 and associated context received from the mobile device.

In some embodiments, the user 138 may be the gift giver and may select a gift from the suggested gifts on the application. The gift giver may select the gift directly through the application in communication with a third-party site or may, upon selection of the gift, be directed to the third-party site via a link. Once the gift is selected, the gift may be purchased and an image of the gift may be stored as a virtual gift for placement in the gifting environment as described in embodiments below.

In some embodiments, the gift may be purchased directly through the application or through a third-party website. The profile of the gift giver may be associated with an account for direct financial transactions such as a savings, checking, or a credit card account or any indirect financial transactions through an intermediate third-party financial transaction institution may be conducted. In some embodiments, the profile of the gift giver may store biometric data for the gift giver. This can be used, for example, to confirm that the gift giver is accessing the application. This may be determined with a password, Personal Identification Number (PIN), or any biometric identifier such as, for example, fingerprint recognition, facial recognition, voice recognition, a retinal scan, or any other biometrics. This may provide a high level of security to the financial transactions conducted by the user 204 through the application.

Figure 2A:
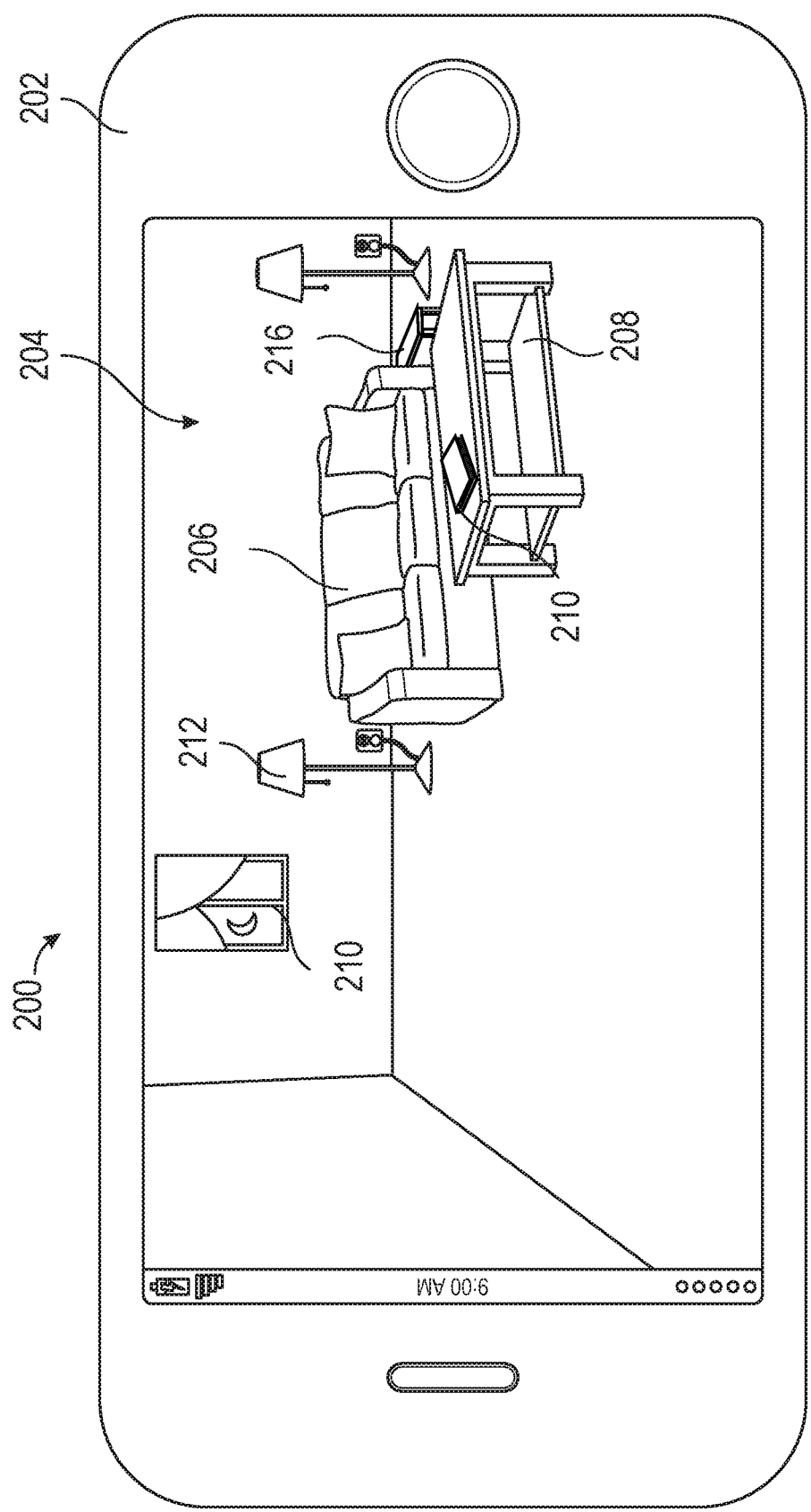
FIG. 2A depicts an embodiment of an application on a giver mobile device scanning a gifting environment.
Figure 2B:
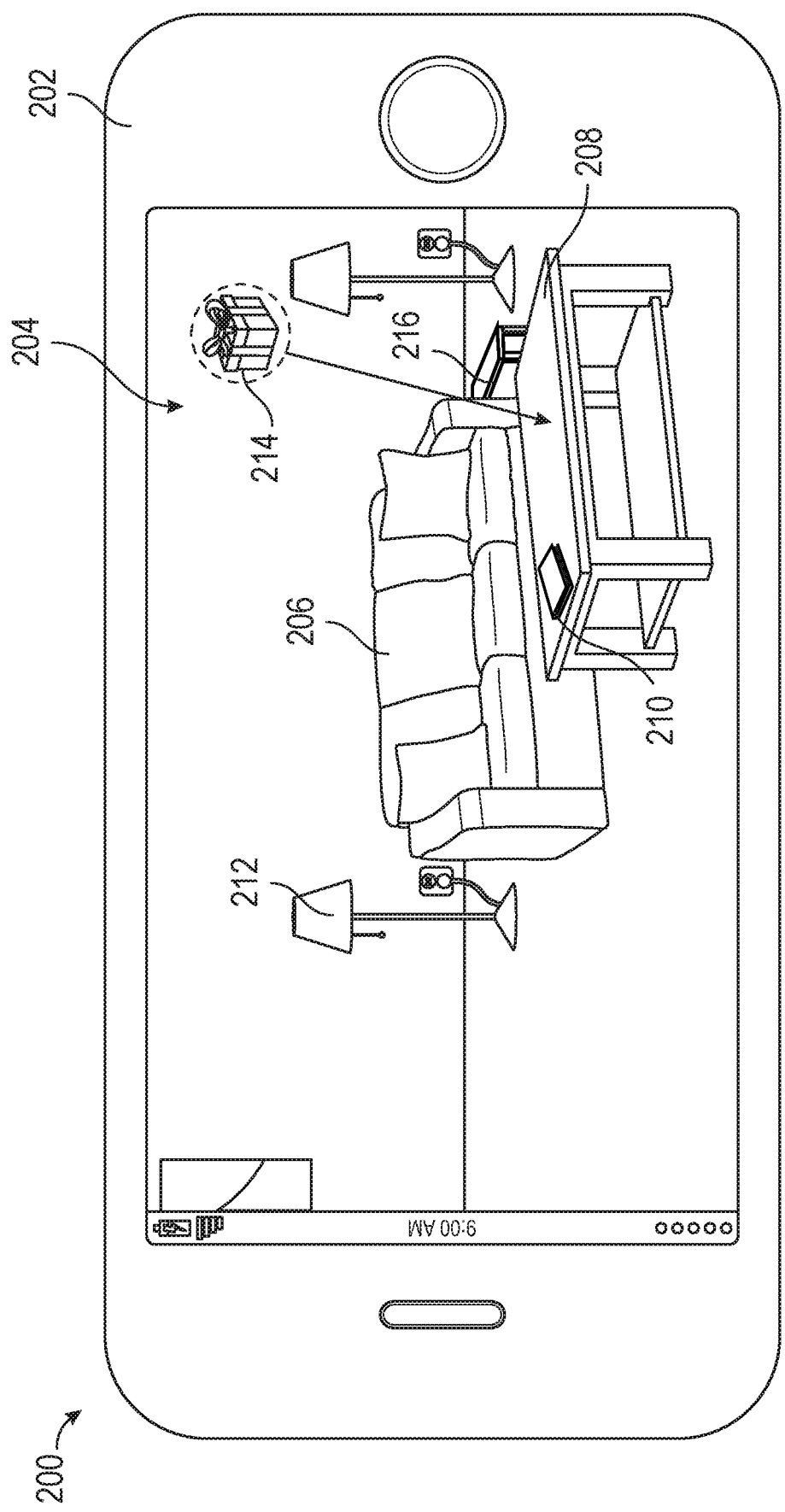
FIG. 2B depicts an embodiment of the application on the giver mobile device placing a virtual gift in the gifting environment.

FIGS. 2A-2B depict a gifting environment 200 or location for placing a virtual gift 214 or augmented reality gifting presentation. In some embodiments the gifting environment 200 is scanned or photographed by the gift giver via the giver mobile device 202 to determine one or more potential locations for gift placement. The image or video may be stored in a remote data store or on the giver mobile device 202 and accessible by the application such that the application may combine a virtual image of the gift for placement in the gifting environment 200.

FIGS. 2A-2B depict the gifting environment 200 which in this case is the exemplary living room 204 including, a couch 206, coffee table 208, book 210, lamp 212, and virtual gift 214. Though the living room 204 is described as the gifting environment 200 in embodiments herein, any environment indoors or outdoors may be the gifting environment 200 and any objects may be used to emplace the virtual gift 214 as described below.

In some embodiments, the virtual gift 214 is representative of the gift to be given from the gift giver to the recipient. The virtual gift 214 may be created by the application or gift giver imaging the gift from a third-party website or by the gift giver taking photograph of the gift and uploading the resulting image to the application. In some embodiments, multiple images may be taken creating different views of the gift such that the application may piece the different views together creating a 3-D image of the gift. The resulting virtual gift 214 may be three dimensional such that it may be rotated to fit on objects and in locations within the gifting environment. The 3-D image of the virtual gift 214 may also provide the recipient a good look at the gift when deciding any modifications before accepting the gift.

The selection of a gift may be made from a third-party vendor or directly through the application from a list of a plurality of suggested gifts as described in embodiments below. The gift may be any type of physical gift, consumer products, services, vouchers, tokens, stored-value card, or electronically redeemable gift at any retail or online store. In some embodiments, the virtual gift 214 may represent or be associated with the gift selected by the gift giver. For example, the application may use any information associated with the user 138 (the gift giver or gift recipient) and scanning of the environment to suggest gifts. For example, if the gift giver has chosen to give the recipient a gift card, the application may access databases of nearby retailers and suggest gifts that match the color or objects in the gifting environment 200 and may be purchased using the gift card. Similarly, a gift card or voucher redeemable at the nearby retailer may be suggested as the gift.

In some embodiments, the suggestions may be based on the decor or objects within the gifting environment 200. For example, the application may determine that the gifting environment 200 is the living room 204 and many of the objects in the living room 204 are from a particular retailer. The application accesses the online website of the retailer and suggests gifts from the website that match the color scheme and decor of the living room 204. The application may also access a recipient online profile on social media or the stored profile of the recipient in the application to determine suitable gifts for the recipient. In some embodiments, the gift may be a stored-value card redeemable at a specific retailer that the recipient frequently visits as determined by object recognition of the gifting environment 200 or accessing information related to the recipient from the online databases.

In some embodiments, the gift is a stored-value card and suggestions for purchase may be provided by the application based on the value of the card. Suggestions for purchase may also be made based on recognized objects in the gifting environment 200. For example, the application may recognize that there is the book 210 in the living room 204. A stored-value card may be selected as the gift by the application based on a stored history of the recipient. The stored-value card may have a twenty-dollar value. The application may suggest or select a stored-value card redeemable at a local bookstore that the recipient frequently visits. The application may also suggest books for purchase that cost approximately twenty dollars or any price corresponding to the value of the stored-value card or a credit associate with the retailer. The book suggestions may also be based on types of books recognized in the scanned environment. Alternatively, the value associated with the stored-value card may be high such that a book stand or other related gift of a corresponding value is suggested.

In some embodiments, a selection of the book 210 for the gift may be made by the gift giver based on suggestions provided by the application. For example, the gift giver may have a stored-value card, voucher, or other stored-value item associated with a vendor or product. The application may suggest to the gift giver that a gift may be provided such as, for example, the book 210, by comparing a stored-value with products associated with the gift giver or the gift recipient through any of the online databases described above.

Further, suggestions may be made based on the scanned environment. For example, if the lamp 212 is scanned by the gift giver using the giver mobile device 202, the application may recognize the lamp 212 as an object and search the online databases to find a retailer for the lamp 212. A plurality of gifts may then be suggested to the gift giver based on the lamp 212 and the retailer associated with the lamp 212. The gift giver may select a suggested gift from the plurality of suggested gifts and add the gift to the application as a purchased gift. The application may then add the virtual gift 214 to the augmented reality gifting environment 200 provided by a scan of the gifting environment 200. The application may store the virtual gift 214 in the database of images and may associate the gift with the gift giver and the recipient to use for targeted marketing and suggestions.

In some embodiments, the application may link to third-party retailers such that the gift giver may find a gift at a website of the third-party retailer and add the gift to the application. The application may recognize the gift and discern a suitable location within the gifting environment 200 for the virtual gift 214, representative of the gift, to be placed. For example, the gift giver may purchase the book 210 from a third-party retailer as suggested by the application based on the available stored-value of the gift giver at the third-party retailer. Upon purchase of the book 210, the application may automatically image the book 210 and suggest placement of the image of the book 210 or place the image of the book 210 as the virtual gift 214 via augmented reality on the coffee table 208 of the scanned living room 204.

Further, the application may market to the gift giver by displaying the gift in the gifting environment 200 of the gift giver prior to purchase. Continuing with the exemplary embodiment described above, the application may suggest the book 210 to the gift giver based on the stored-value associated with the third-party retailer, or a stored-value card, and the price of the book 210. The application may suggest the gift by placing it in a stored gifting environment associated with the gift giver or the recipient. The stored gifting environment may be a previously used gifting environment 200. The gift may be suggested based on a stored-value, a scanned environment, a profile of the gift giver and the recipient, and any online databases and social media accounts as described above.

In some embodiments, the virtual gift 214 may be presented in a box, envelope, or any such template that may be provided by the application and customizable by the user. Images, text, video, personal hand written and scanned notes, caricatures of the gift giver and the recipient, or any other personalization may be virtually added to the gifting environment 200 or the virtual gift 214.

In some embodiments, the gifting environment 200 may be a residence of the gift giver or the recipient. For example, the embodiment depicted in FIG. 2A presents the living room 204 with the couch 206 and the coffee table 208. In some embodiments, the images of the gifting environment 200 may be uploaded such that the application may combine the uploaded images or video with the virtual gift 214 to present the gift to the recipient. The images and video may also be taken using a camera on the giver mobile device 202 or may be uploaded to the application from a peripheral device such as a camera, a computer, a tablet, or another device capable of taking a photograph or a video. Images and video of the gifting environment 200 may be stored on the giver mobile device 202 and added to the application by drag-and-drop or any other method. In other embodiments, the gifting environment 200 may be scanned in real time by a recipient mobile device of the recipient during the process of receiving the gift or in advance as a part of registering the application.

In some embodiments, the gifting environment 200 may also be a restaurant, bowling alley, sports arena, or any other indoor location. The gifting environment 200 may also be an outdoor location. For example, the gift giver may scan or image a patio, deck, wooded area, beach, or any other outdoor location that the gift giver may use as the gifting environment 200 to present the gift. Further, the location may be outdoors and the objects may include picnic tables, beaches, boats, decks, patios, or any other objects or environments that may be imaged and stored in the application database. The application may match the outdoor area with locations and objects in a database with stored outdoor scenes and find a suitable object and gift to suggest to the gift giver. Once selected, the object may be presented, via the application on the recipient mobile device, to the recipient.

In some embodiments, the application may utilize object recognition to recognize objects within the gifting environment 200 for placement or hiding of the virtual gift 214. The application may compare objects in the images of the living room 204 with images in a database and recognize shapes, colors, and arrangements of object within the living room 204 and compare those images with a database of objects and arrangements. The application may also relate the objects and the arrangements with similar objects and arrangements that are found in a similar room from the database. The objects may be defined from contrasts between the objects and background and the shape may be matched to a database of shapes to determine the objects. Once the objects are determined it may be determined if the objects are suitable for the virtual gift 214 to be emplaced. The type of object and the type of gift may be used to determine the placement of the virtual gift 214 (e.g. flowers on a table or picture on a wall). For example, as depicted in FIG. 2A, the application may recognize that the couch 208 is in the living room 204 by comparing the shape of the couch 208 to images in the database. The application may recognize that the couch 208 may be an appropriate gift location to place, for example, a virtual gift such as a pillow or a blanket but appropriate for a picture or a bowl. The application may also recognize the type of couch 208, the manufacturer of the couch 208, and retailers near the location of the gift giver and the recipient that sell the couch 208. In some embodiments, the application may relate the couch 208 to other objects from the manufacturer or the retailer and suggest gifts that may complement the couch 208 or any other objects in the room. In some embodiments, the application may access social media or the profile of the gift giver and the recipient to make gift selections as described in more detail below.

In some embodiments, the application may detect objects that are unrecognized because they are partially concealed. Continuing with the above-described exemplary embodiment, an object may be partially concealed by the couch 206. The application may scan living room images in a database and determine that many couches in the database images have end tables at the location that the unrecognized object is located. The application may determine with a calculated level of confidence that the unrecognized object is an end table 216 and determine that the end table 216 is a suitable location for the gift. The application may place the virtual gift 214 on the end table 216 in the image such that the virtual gift 214 is revealed when the recipient of the gift scans the living room 204 with the camera of the recipient mobile device running the application.

In some embodiments, the application may determine an object by recognizing a flat surface or a suitable location for the virtual gift 214 emplacement based on the gift and the objects in the gifting environment 200. For example, the gift giver may buy a comforter at an online third-party retailer and upload an image of the virtual gift 214 to the application. The gift giver may also enter a number associated with the comforter or select a retailer in the application and select the comforter from options provided by the application accessing a database. For selection of the gifting environment 200, the gift giver may scan, for example, a bedroom. The application may recognize the bedroom and the objects in the bedroom and through augmented reality place the virtual gift 214 or, for example, an image of the comforter on the bed for viewing by the recipient upon viewing the bedroom with the application running on the recipient mobile device.

In the event that the software cannot define a suitable gift placement object with a high level of certainty the application may offer suggestions to the gift giver for placement of the virtual gift 214. For example, the application may suggest that the lighting be changed in the gifting environment 200 or that the gift giver perform the scan of the gifting environment 200 from a different location such as inside or in a direction away from a light source.

In some embodiments, the application may receive input from the gift giver such as room type or defining or labeling particular objects in the gifting environment 200. For example, the gift giver scans a room and the application is unable to discern the room type. The application prompts the gift giver to label the room. The user types "bedroom." The application may then narrow the options to known images of bedrooms to compare objects within the room. Further, the gift giver may select objects and define the objects with text inputs such as "dresser" or "bed". The application may then deduce that the gifting environment 214 is a bedroom and narrow the database search to objects in a bedroom. From the text inputs and label recognition, the application may select suitable objects for placement of the virtual gift 214.

In some embodiments, the object may be selected by the gift giver. The gift giver may select an object in a the living room 204 once the living room 204 has been scanned and the application has identified objects, the gift giver may select an object in the living room 204 for placement of the virtual gift 214. Once the object is selected, the virtual gift 214 may appear on the screen in the gifting environment 200. The gift 214 may be edited such that the gift giver may move the virtual gift 214 in any translational or rotational way or change the size of the virtual gift 214 to place the virtual gift 214 in a realistic manner on the object, for example, the coffee table 206 in the living room 204. In some embodiments, the size, shape, and position of the virtual gift 214 is changed automatically by the application to present a realistic placement on the coffee table 206 within the gifting environment 200.

In certain embodiments, the virtual gift 214 may be tied to a particular geographical location. The recipient may be presented with the virtual gift 214 or hints as to what the gift may be and may or may not access the gift unless the recipient is in a specified gift location or gifting environment 200. The gift location may be associated with GPS coordinates and the application may track a recipient location relative to the location of the gift and/or direct the recipient to the location of the gift. In some embodiments, the location of the gift is the gifting environment 200 for presentation of the virtual gift 214.

Figure 3A:
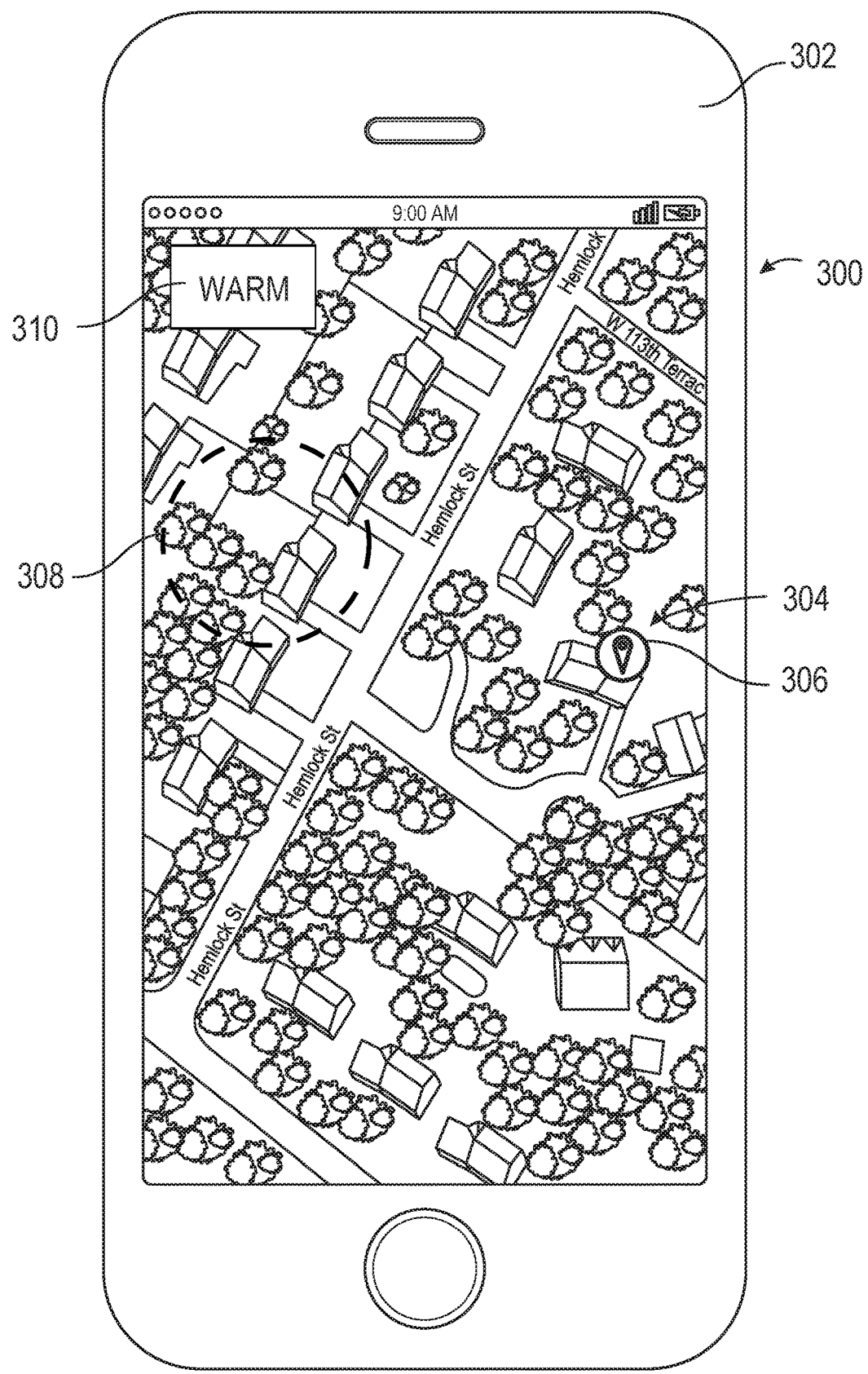
FIG. 3A depicts an embodiment of the application displaying a map.

Turning now to FIG. 3A where, in some embodiments, a map 300 may be displayed on the recipient mobile device 302. The recipient location 304 may be represented by a marker 306. The recipient location 304 may be visible on the map 300 and, in certain embodiments, the application provides hints to the recipient in an exemplary scavenger hunt type scenario. For example, the recipient may receive a notice that a gift the virtual gift 214 is hidden and that the recipient must find it. The notice may be received from notification methods such as email, text, instant message, audio message, video message, application alerts, or may be received from any user 138 associated social media site. The recipient may receive more hints based on time spent looking for the gift or based on GPS location through features such as geo-fencing. If the recipient is within a certain range or passes a certain checkpoint more hints may be provided. Similarly, if a certain time has passed and the recipient is not making sufficient progress then further hints may be provided. The frequency of hints may be customized by the gift giver and the recipient. Upon arrival to the gift location the recipient may access the application and use the camera on the recipient mobile device 302 to scan the area. For example, a picnic (the gift) is revealed as a virtual gift 214 on a blanket (the object) that the gift giver has left for a picnic. In other exemplary embodiments, picnic may be revealed to the recipient as the virtual gift 214 at any point and the recipient may need to find the gift location which, in some embodiments, may be the gifting environment 214, to find the picnic (the gift). In some embodiments, the virtual gift 214 may be an electronic gift such as an e-card, voucher, token, or gift card.

In some embodiments, a proximate gift location 308 may be presented to the recipient. This may narrow the search area for the recipient. The application may provide hints using the proximate gifting location 308 in an exemplary game of hot and cold. The location of the gifting environment 200 may be known through GPS or a proximity sensing method. The gift may be in the location and have an accessible GPS device or the location may be input by the gift giver when selecting and placing the gift as described in embodiments above. The application may provide hints based on the location of the recipient mobile device 302 in relation to the gift or the gifting environment 200. The application may also provide a hot indication when the recipient mobile device 302 is less than a designated distance from the gift and a cold indication when the recipient mobile device 302 is greater than designated distance from the gift. The indications may be provided by voice, text, or any indication representing any hot, cold, or any other representative temperature such as warm, cool, or ice cold. In some embodiments, the notifications are provided on the map 300 as a proximity indicator 310 that may be colored or provide text to indicate the proximity such as, for example, a calculated distance to the virtual gift 214. In some embodiments, the map 300 may be a heat map that displays different levels of hot and cold as the recipient moves closer to the virtual gift 214 or the gifting environment 200.

In some embodiments, the gift may be received by accessing the web-based application such that the recipient does not download the application. Alternatively, the recipient may have the application installed on the recipient mobile device 302 and may access the gift using the installed application. The recipient may get a notification via email, message, social media, or any other messaging system, or may receive an alert via the installed application. Upon receiving the notification, the recipient may access the application and receive hints, instructions, personalized messages, text, video, or pictures uploaded by the gift giver or selected from application provided templates.

Figure 3B:
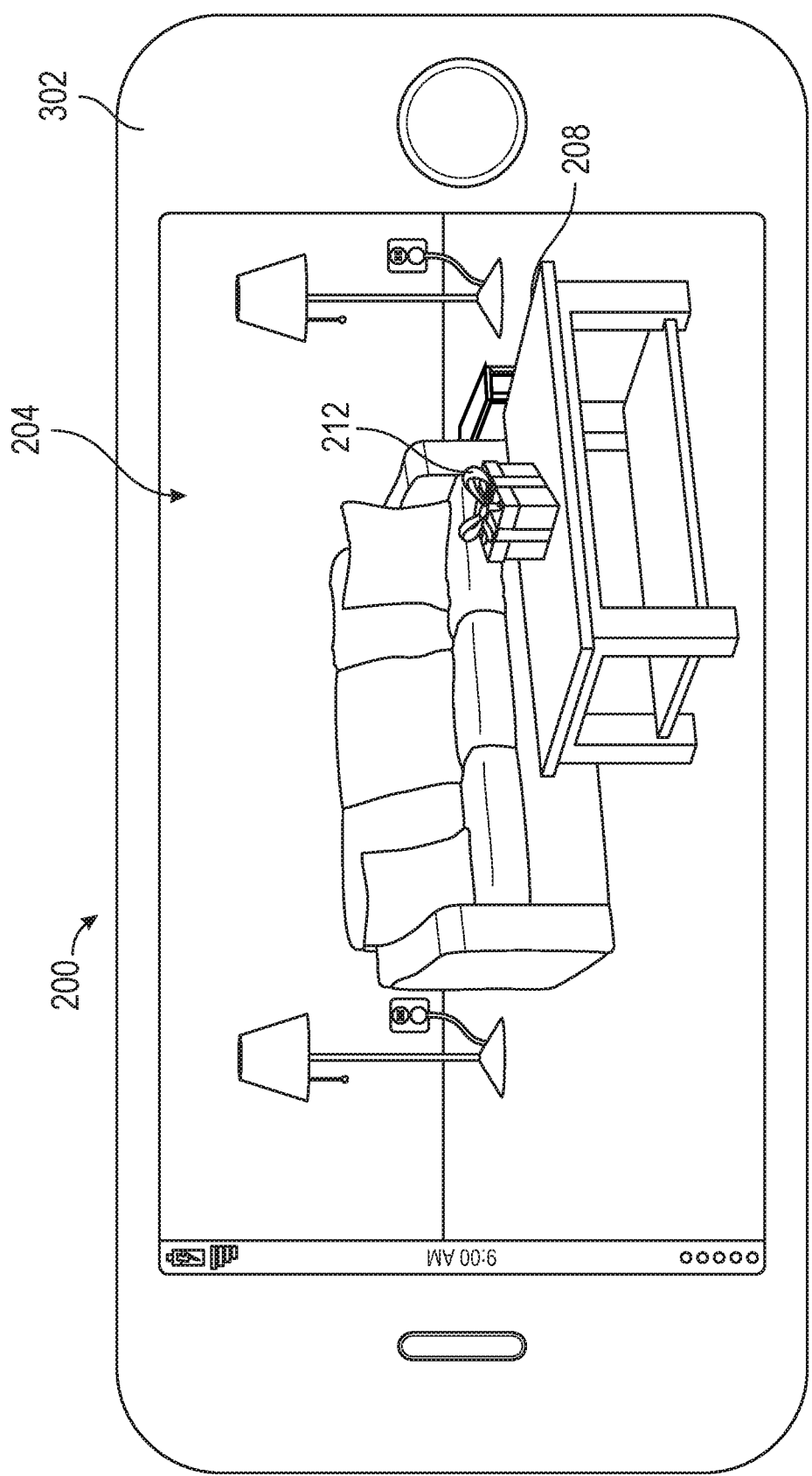
FIG. 3B depicts an embodiment of the application displaying the gifting environment presenting the virtual gift.

FIG. 3B depicts on embodiment of the recipient mobile device 302 presenting the gifting environment 200 with the virtual gift 214 displayed on the coffee table 208. In some embodiments, the recipient may be at any location and view the scanned gifting environment 200 including the virtual gift 214. For example, the recipient may be at work and receive a text message that a gift has been left in the recipient's living room 204 and that the virtual gift 214 may be viewed via the application. Upon accessing the application on the recipient mobile device 302, the recipient views the living room 204 with the virtual gift 214 on the coffee table 208. The recipient arrives home to receive the gift on the living room 204 coffee table 208 as viewed via the gifting environment 200 on the recipient mobile device 302.

In some embodiments, the virtual gift 214 is presented in the gifting environment 200 to the recipient as depicted in FIG. 3B. In some embodiments, the recipient must be in or otherwise viewing the environment represented by the virtual gifting environment 200 to view the virtual gift 214. The application may recognize the objects as the recipient scans the gifting environment 200 and places or presents the virtual gift 214 thus presenting the virtual gift 214 to the recipient. For example, the recipient may be in the living room 204 and scan the living room 204 with the recipient mobile device 302. The application may recognize that the recipient mobile device 302 is at the correct location by GPS and by recognition of the objects in the gifting environment 200. When the recipient scans the coffee table 208, the application recognizes the coffee table 208 as the object for placement of the virtual gift 214 and presents the virtual gift 214 in augmented reality in real time as the gifting environment 200 is scanned via the recipient mobile device 302. In this case, the view of the living room 204 may be a live view from the camera of the recipient mobile device 302 and the virtual gift 214 is added to the scene through augmented reality.

In some embodiments, the recipient may use the camera of the recipient mobile device 302 running the application downloaded on the recipient mobile device 302 or through an online website. The recipient may view the living room 204 via the camera. When the coffee table 208 comes into view, the virtual gift 214 may be displayed on the coffee table 208 in augmented reality. This provides the recipient with a view of the virtual gift 214 in the living room 204. This is a surprise to the recipient and also provides the recipient and the gift giver a method for viewing the gift in the gifting environment 200 prior to accepting the gift.

In some embodiments, the recipient may modify or select different gifts to be displayed as the virtual gift 214. For example, the gift may be the couch 206. The recipient may not care for the color of the couch 206 and may access the third-party retailer and change the color as desired. This may provide the recipient the option to see the virtual gift 214 in the living room 204 before purchase or accepting the gift. Further, the gift giver may provide selection for different colors, sizes, or any other option for the gift such that the recipient may scroll through the different options as the virtual gift 214 in the gifting environment 200 and select the most desired.

Figure 3C:
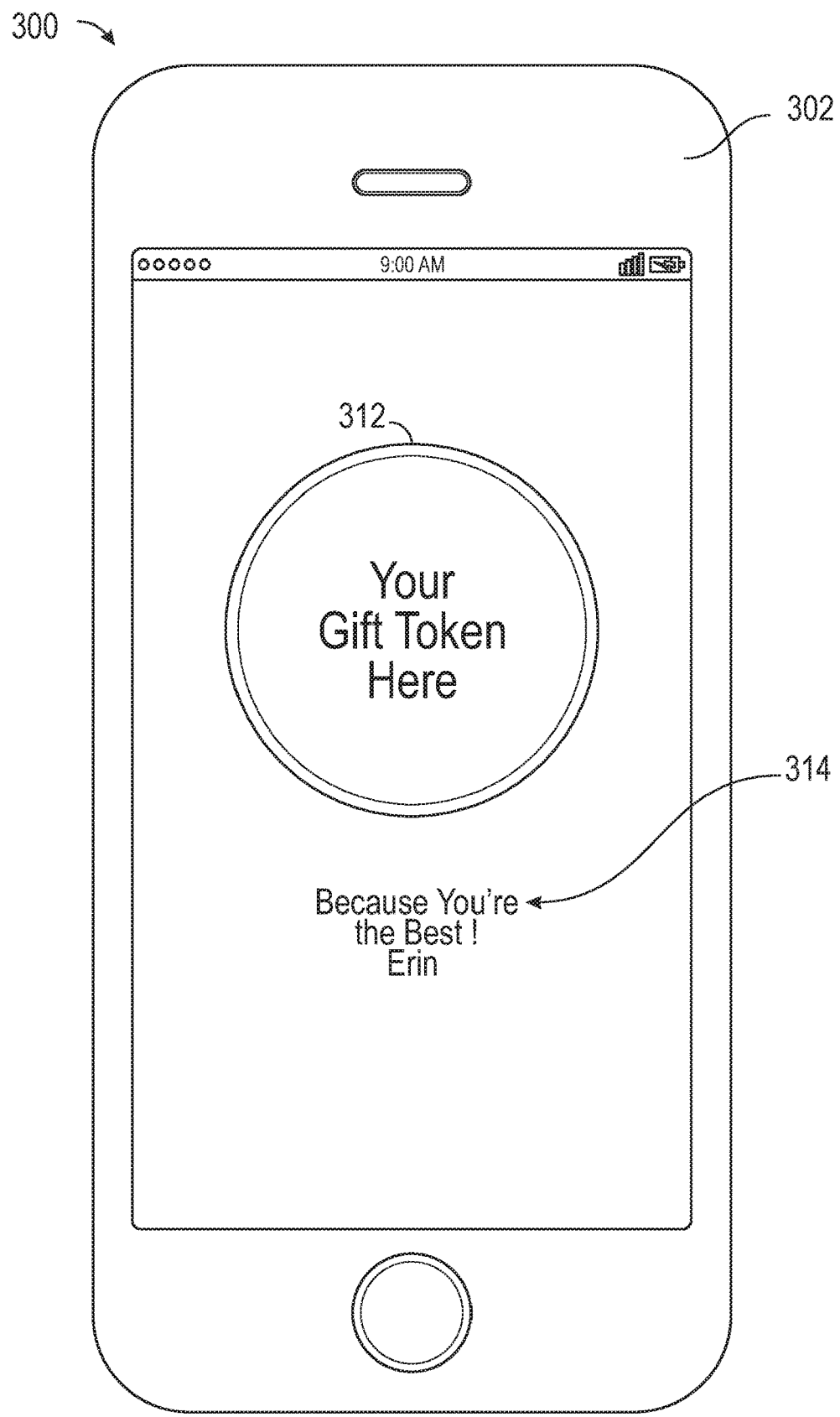
FIG. 3C depicts an embodiment of the application presenting the gift.

FIG. 3C depicts the recipient mobile device 302 displaying the virtual gift 214. When the recipient has located the virtual gift 214, the virtual gift 214 may be selected and the gift 306 accepted. The gift 306 may be received by any method of interaction with the recipient mobile device 302. The recipient may interact with the recipient mobile device 302 by tilting, shaking, touching, swiping, and making a facial expression or movement detected by the application accessing the camera of the recipient mobile device 302. For example, the virtual gift 214 may be wrapped as depicted in FIG. 3B. The recipient may touch, swipe, or otherwise interact with the recipient mobile device 302 in any method as describe above and the virtual gift 214 unwraps to reveal the gift. In some embodiments, the gift 312 may also be revealed or accessed through biometric identification such as facial, retinal, fingerprint, or any other biometric recognition.

Upon reveal of the gift 312, the application may access peripheral devices of the recipient mobile device 302 to provide feedback to the recipient. For example, the application may provide a sound, for example, of the virtual gift 214 unwrapping, or a vibration of the recipient mobile device 302, or lights illuminating on the recipient mobile device 302. The camera of the recipient mobile device 302 may automatically activate taking images or video to capture the recipient at the time of the reveal or when the gifting environment 200 is detected by the application.

In some embodiments, the gift 312 may be a token as depicted in FIG. 3C, or any gift card, e-card, or voucher that may be redeemable online or electronically redeemable. In some embodiments, the gift 312 may be a physical gift that may be sent directly to the recipient upon selection and acceptance. The physical gift may be sent to any user 138 that may be associated with an account or profile accessible by the application.

In some embodiments, the gift 312 may be revealed with a personal message 314. The personal message 314 may be text, audio, video, photographs, or any other method of customization for displaying a personalized item to the recipient. The personal message 314 may also link to a website of the gift giver, the recipient, or a third-party retailer of the gift 312. In some embodiments, the personal message 314 provides the options for modifying the gift 312 as described in embodiments above. After modification of the gift 312 the recipient may return to the gifting environment 200 and view the modified virtual gift 214 in the gifting environment 200 as described in embodiments above.

In some embodiments, the gift 312 is presented with a gift receipt or a gift receipt is sent to the recipient automatically upon accepting the gift 312. The gift receipt may be sent via text message, email, instant message, through a social media account, or any other method that information may be passed to the recipient. In some embodiments, the gift receipt is uploaded to the profile of the recipient such that the recipient may view and print the gift receipt at any time.

Figure 4:
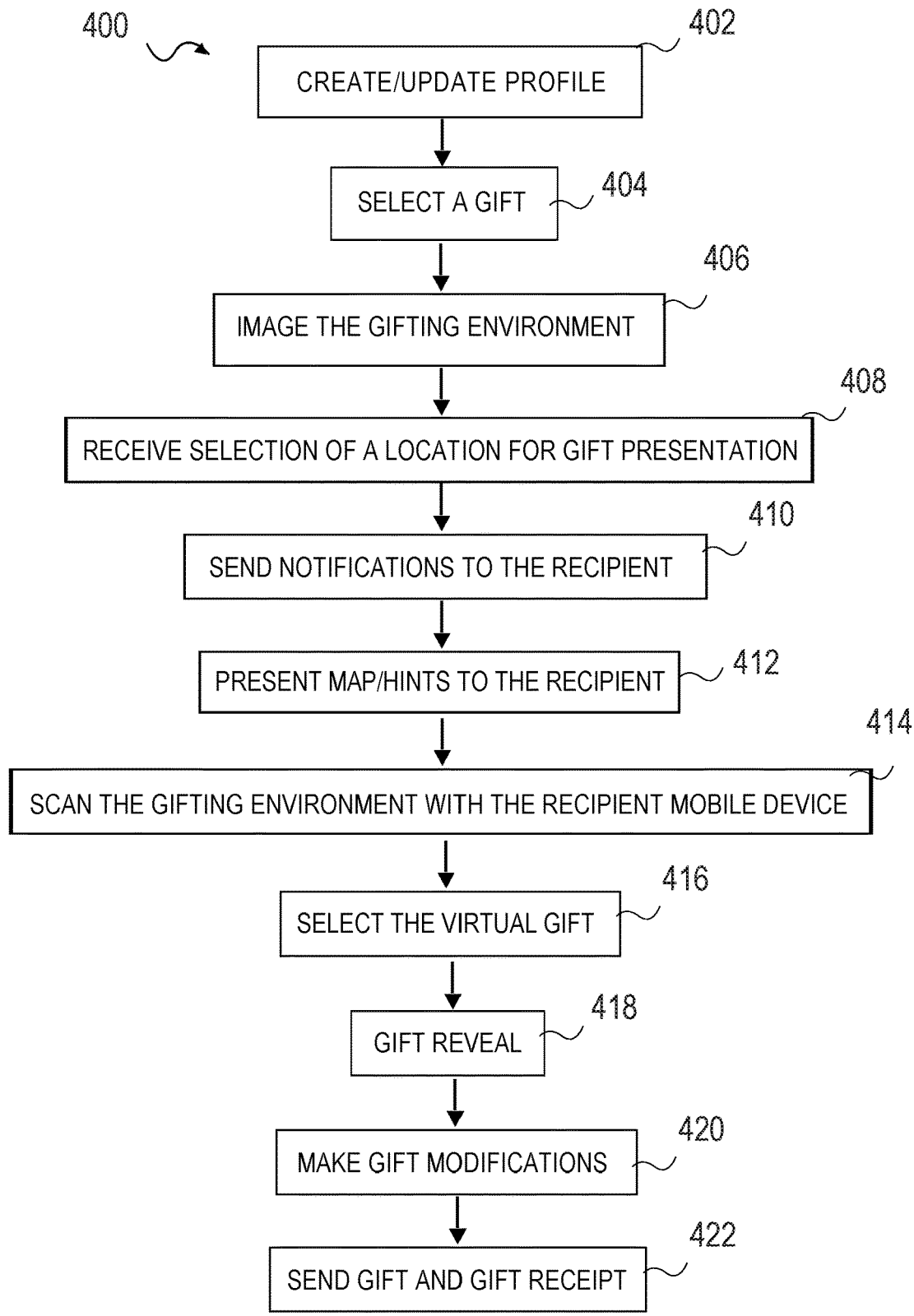
FIG. 4 depicts an exemplary flow diagram of embodiments of the invention for selecting and placing a gift.

FIG. 4 depicts an exemplary flow diagram 400 for embodiments of the invention. At step 402 the profile of the user 138 is created and/or updated. The user 138, in the case of a gift giver, may create a profile associated with the application such that the user 138 may access the application for, in some embodiments, selection and purchase of the gift 312 and placement the virtual gift 214 in the gifting environment 200 as described in embodiments above. The user 138, in the case of the recipient, may create a profile and utilize the application to receive the gift 312 via the recipient mobile device 302 displaying the virtual gift 214 in the gifting environment 200.

At step 404, the gift giver may receive offers or suggestions for gifts based on the profile of the gift giver or the recipient as in embodiments described above. The application may access any information associated with the gift giver and the recipient provided by the gift giver and the recipient on the profile such as, for example, age, physical features, location, friends, favorite sports, favorite TV shows, favorite music, or any other information that may be used to select the gift 312. The gift giver may select at least one gift 312 from a plurality of suggested gifts or the gift giver may select the gift 312 that the gift giver chooses online or in store.

At step 406, the gift giver may utilize the camera associated with the giver mobile device 202 and take an image or video of the gifting environment 200 as described in embodiments presented above. The image or video may be used to select objects for placement of the virtual gift 214 and for reveal of the gift 312 to the recipient.

At step 408, the gift giver may place the virtual gift 214, or select a location, in the gifting environment 200 for the virtual gift 214 to be presented as describe in embodiments presented above. The gift giver may choose from objects in the gifting environment 200 suggested by the application or the gift giver may select on object or just place the virtual gift 214 anywhere in the gifting environment 200. The gift giver may also provide a GPS location of the virtual gift 214 and the gifting environment 200 for use with embodiments of the invention. The application may use the location of the virtual gift 214 and the gifting environment 200 to send information to the recipient.

At step 410, a notification may be sent to the recipient providing information related to the gift 312 as described in embodiments presented above. The notification may indicate that the gift 312 is waiting for the recipient and may provide location information or hints as to the location of the gift 312. Personal information or greetings such as Happy Birthday, Congratulations, or any other celebratory greeting or personally customized content from text, images, videos, or the like may be provided with the notification. In some embodiments, the gifting environment 200 and the virtual gift 214 may also be sent or otherwise linked to the notification.

At step 412, the recipient may search for the gifting environment 200 and the virtual gift 214 as described in embodiments above. The recipient may receive notifications and hints directing the recipient to the location of the virtual gift 214. The notifications may be provided at regular intervals or periodically based on time or location of the recipient mobile device 302 relative to the location of the virtual gift 214 and the gifting environment 200.

At step 414, the gifting environment 200 may be displayed via the camera of the recipient mobile device 302. The recipient may utilize the recipient mobile device 302 to scan the gifting environment 200. The application may recognize the objects in the gifting environment 200 and place the virtual gift 214 in the scanned image of the recipient thus presenting the virtual gift 214 to the recipient in real time as the gifting environment 200 is scanned.

At step 416, the virtual gift 214 is selected. The recipient may select the virtual gift 214 by touching, swiping, speaking, or making a gesture recognized by any sensor of the recipient mobile device 302 that may sense any interaction from the recipient. In some embodiments, a personal message 314 is also presented that may be selectable and provide a link to a website or third-party retailer.

At step 418, the gift 312 is presented to the recipient. Upon selection of the virtual gift 214 the gift 312 may be revealed to the recipient as described in embodiments above. The reveal may be animated in the augmented reality environment such as with a gift opening, fireworks, animals celebrating, or any other celebratory display or animation that may be selected by the gift giver or the application. The gift 312 reveal may also include the personal message 314 that may be from the gift giver or a plurality of gift givers, and may be a text, images, videos, audio, or any other personal message 314.

At step 420, the recipient may input modifications and accept the gift 312 as described in embodiments above. The user 138 may access a third-party retailer and modify the colors, shapes, designs, sizes, or any other features and view the virtual gift 214 with the modifications in the gifting environment 200 prior to accepting the gift 312.

At step 422, the gift 312 may be automatically sent along with a gift receipt to the recipient upon accepting the gift 312 as described in embodiments above. The address and any other information from the recipient may be obtained from the profile of the recipient or the profile of the gift giver.

At any time and any interaction with the user 138 the application and profiles may update. Any information gained from the interaction with the user 138 may be stored for future use and to modify offers and suggestions of gifts and personal information associated with the user 138.

Any steps provided in embodiments of the invention and described in methods may be omitted, added, and rearranged. Multiple methods for selecting and placing and receiving and accepting gifts may be utilized as described in embodiments provided herein.

Some embodiments of the invention utilize machine learning, neural networks, fuzzy logic, or any other statistical, or general mathematical algorithm or artificial intelligence to increase the efficiency of the application and create a more user-friendly experience. The mathematical algorithms may be used for recommending gifts based on online databases such as social media or location and user demographics. The mathematical algorithms may be used along with user feedback to increase environment recognition and discern objects within the gifting environment 200. For example, in the event that an object is placed in a location that is not suitable for the gift 312 such as, for example, an electronic device placed in a sink, the user 128 may provide negative feedback and the results of the process may be re-evaluated, stored, and incorporated into the algorithms for future use. Further, positive feedback may be used to strengthen the positive outcomes thus increasing the likelihood of positive outcomes and decreasing the likelihood of negative outcomes.

Although the invention has been described with reference to the embodiments illustrated in the attached drawing figures, it is noted that equivalents may be employed and substitutions made herein without departing from the scope of the invention.

Having thus described various embodiments, what is claimed as new and desired to be protected by Letters Patent includes the following:

1. One or more non-transitory computer-readable media storing computer-executable instructions that, when executed by a processor, perform a method of presenting a virtual gift to a recipient using augmented reality, the method comprising:
   receiving a selection of a gift from a gift giver, the gift selected from a plurality of suggested gifts;
   obtaining an image of the gift from a third party retailer;
   receiving at least one image of a gifting environment via a giver mobile device, using the image of the gifting environment to select objects for placement of the gift;
   receiving a scan of the gifting environment from a recipient mobile device;
   discerning a plurality of objects from the gifting environment;
   presenting one or more suggested virtual gift placement locations, and receiving selection of a virtual gift placemen location;
   presenting the virtual gift in a real-time scan of the gifting environment on the recipient mobile device to create an augmented reality of the gifting environment;
   receiving one or more modifications to the gift from the recipient; and
   creating a modified virtual gift by obtaining an image of the gift with the one or more modifications from a third party retailer;
   presenting the modified virtual gift in the gifting environment to the recipient mobile device.

2. The method of claim 1, further comprising:
   receiving a gift environment location via the giver mobile device.

3. The method of claim 2, wherein the gifting environment location is received as global positioning system (GPS) coordinates.

4. The method of claim 3, further comprising:
   providing at least one notification to the recipient via the recipient mobile device, wherein the at least one notification is indicative of at least one of the gifting environment location and a virtual gift location.

5. The method of claim 1, further comprising:
   receiving a virtual gift location within the gifting environment from the giver mobile device.

6. The method of claim 5, wherein the virtual gift location is selected by the gift giver via the giver mobile device from a plurality of virtual gift locations recognized in the gifting environment.

7. The method of claim 6, wherein the virtual gift location is recognized using object recognition and the virtual gift is presented to the recipient via the recipient mobile device at the virtual gift location during the real-time scan.

8. The method of claim 1, wherein the recipient receives at least one notification when the virtual gift is placed in the gifting environment.

9. The method of claim 1, wherein the gift is selected by the gift giver via the gift giver mobile device from a plurality of suggested gifts.

10. The method of claim 1, wherein the gift is revealed to the recipient upon receiving an input via the recipient mobile device.

11. The method of claim 10,
    wherein the input is at least one of a touch of the recipient mobile device, a movement of the recipient mobile device, and an expression of the recipient recorded via a camera associated with the recipient mobile device,
    wherein the gift is revealed by at least one of unwrapping the virtual gift, opening the virtual gift, and a celebratory display, and
    wherein the gift is at least one of a physical gift, a gift card, a token, and an electronically redeemable gift.

12. A method for selecting and presenting a virtual gift to a recipient using augmented reality, the method comprising:
    receiving a selection of a gift from a gift giver, the gift selected from a plurality of suggested gifts;
    determining a virtual representation of the gift selected from an online website of a third party retailer, the virtual representation comprising an image;
    receiving at least one image of a gifting environment via a giver mobile device, using the image of the gifting environment to select objects for placement of the gift;
    discerning a plurality of objects from the gifting environment;
    determining at least one object from the plurality of objects for placement of the virtual gift;
    presenting one or more suggested virtual gift placement locations, and receiving selection of a virtual gift placemen location;
    presenting the gifting environment and the virtual gift to the gift recipient;
    receiving one or more modifications to the gift from the recipient; and
    presenting a modified virtual gift in the gifting environment to the recipient mobile device, the modified virtual gift comprising an image of the gift with the one or more modifications retrieved from an online website of the third party retailer.

13. The method of claim 12, wherein the virtual gift is an image taken by a camera associated with the giver mobile device.

14. The method of claim 12, wherein the virtual gift is an image retrieved from a third-party website.

15. The method of claim 12, wherein the at least one object is determined from the plurality of objects by object recognition.

* * * * *